(12) United States Patent
Friesen et al.

(10) Patent No.: US 12,486,184 B2
(45) Date of Patent: Dec. 2, 2025

(54) SYSTEMS AND METHODS FOR WATER PRODUCTION, TREATMENT, ADJUSTMENT AND STORAGE

(71) Applicant: Source Global, PBC, Scottsdale, AZ (US)

(72) Inventors: Cody Friesen, Scottsdale, AZ (US); Michael Robinson, Scottsdale, AZ (US); Joshua Peterson, Scottsdale, AZ (US); Jonathan Goldberg, Scottsdale, AZ (US); G. Michael Ray, Scottsdale, AZ (US)

(73) Assignee: SOURCE Global, PBC, Scottsdale, AZ (US)

( * ) Notice: Subject to any disclaimer, the term of this patent is extended or adjusted under 35 U.S.C. 154(b) by 356 days.

(21) Appl. No.: 17/961,484

(22) Filed: Oct. 6, 2022

(65) Prior Publication Data
US 2023/0113840 A1 Apr. 13, 2023

Related U.S. Application Data

(60) Provisional application No. 63/253,847, filed on Oct. 8, 2021.

(51) Int. Cl.
C02F 1/00 (2023.01)
B67D 7/76 (2010.01)
(Continued)

(52) U.S. Cl.
CPC ............... C02F 1/78 (2013.01); B67D 7/766 (2013.01); C02F 1/008 (2013.01); C02F 1/66 (2013.01);
(Continued)

(58) Field of Classification Search
CPC ........ C02F 1/78; C02F 1/66; C02F 2201/782; C02F 2209/001; C02F 2209/006;
(Continued)

(56) References Cited

U.S. PATENT DOCUMENTS 1,816,592 A 7/1931 Knapen
2,138,689 A 11/1938 Altenkirch
(Continued)

FOREIGN PATENT DOCUMENTS

CN 1774401 A 5/2006
CN 1325854 C 7/2007
(Continued)

OTHER PUBLICATIONS

English translation of JP_2012526657A, published Nov. 1, 2012 (Year: 2012).*

(Continued)

Primary Examiner — Joseph W Drodge
(74) Attorney, Agent, or Firm — Fish & Richardson P.C.

(57) ABSTRACT

This disclosure is related to systems and methods for water treatment, storage and customization, and more particularly, to systems and related methods for water production, sanitation, adjustment, maintenance, storage and dispensing of potable water to a user. The systems and methods described herein can provide several advantages including providing consistent high-quality water at point-of-use locations, thereby avoiding inconveniences of transport, unpredictable or wasteful supply chains and/or alleviate water needs at remote locations. Furthermore, the systems and methods described herein can offer a seamless digital consumer experience with high accuracy reporting of water production, storage, quality and personalization for the user.

20 Claims, 21 Drawing Sheets

(51) Int. Cl.
*C02F 1/66* (2023.01)
*C02F 1/78* (2023.01)

(52) U.S. Cl.
CPC .. *C02F 2201/782* (2013.01); *C02F 2209/001* (2013.01); *C02F 2209/006* (2013.01); *C02F 2209/06* (2013.01); *C02F 2209/23* (2013.01); *C02F 2209/42* (2013.01); *C02F 2301/046* (2013.01)

(58) Field of Classification Search
CPC ............. C02F 2209/06; C02F 2209/23; C02F 2209/42; C02F 2301/046; C02F 2201/009; C02F 2209/02; C02F 2209/05; C02F 1/68; C02F 2209/055; C02F 2209/07; C02F 2209/11; C02F 2209/24; C02F 2209/36; C02F 2301/043; C02F 1/00; C02F 2201/006; C02F 2209/40; C02F 2303/04; C02F 1/008; C02F 1/685; C02F 1/686; C02F 1/687; B67D 7/08; B67D 7/36; B67D 7/76; B67D 7/766; B67D 7/78; B67D 2210/00013; B67D 2210/00023
See application file for complete search history.

(56) References Cited

U.S. PATENT DOCUMENTS

| | | | |
|---|---|---|---|
| 2,284,914 A * | 6/1942 | Miller | F24F 11/30 62/271 |
| 2,462,952 A | 3/1949 | Dunkak | |
| 2,700,537 A | 1/1955 | Pennington | |
| 2,761,292 A | 9/1956 | Coanda et al. | |
| 3,102,532 A | 9/1963 | Shoemaker | |
| 3,400,515 A | 9/1968 | Ackerman | |
| 3,676,321 A | 7/1972 | Cunnnings et al. | |
| 3,683,591 A * | 8/1972 | Glav | F28D 5/00 95/126 |
| 3,740,959 A | 6/1973 | Foss | |
| 3,844,737 A * | 10/1974 | Macriss | B01D 53/261 62/271 |
| 3,889,532 A | 6/1975 | Pilie et al. | |
| 3,889,742 A | 6/1975 | Rush et al. | |
| 4,054,124 A | 10/1977 | Knoos | |
| 4,080,186 A | 3/1978 | Ockert | |
| 4,117,831 A | 10/1978 | Bansal et al. | |
| 4,134,743 A | 1/1979 | Macriss et al. | |
| 4,136,672 A | 1/1979 | Hallanger | |
| 4,146,372 A | 3/1979 | Groth et al. | |
| 4,169,459 A | 10/1979 | Ehrlich | |
| 4,185,969 A | 1/1980 | Bulang | |
| 4,201,195 A | 5/1980 | Sakhuja | |
| 4,219,341 A | 8/1980 | Hussmann | |
| 4,222,244 A | 9/1980 | Meckler | |
| 4,234,037 A | 11/1980 | Rogers et al. | |
| 4,242,112 A | 12/1980 | Jebens | |
| 4,285,702 A | 8/1981 | Michel et al. | |
| 4,304,577 A | 12/1981 | Ito et al. | |
| 4,315,599 A | 2/1982 | Biancardi | |
| 4,334,524 A | 6/1982 | McCullough et al. | |
| 4,342,569 A | 8/1982 | Hussmann | |
| 4,345,917 A | 8/1982 | Hussmann | |
| 4,351,651 A | 9/1982 | Courneya | |
| 4,374,655 A | 2/1983 | Grodzka et al. | |
| 4,377,398 A | 3/1983 | Bennett | |
| 4,398,927 A | 8/1983 | Asher et al. | |
| 4,405,343 A | 9/1983 | Othmer | |
| 4,433,552 A | 2/1984 | Smith | |
| 4,478,210 A | 10/1984 | Sieradski | |
| 4,722,192 A | 2/1988 | Koblitz et al. | |
| 4,726,817 A | 2/1988 | Roger | |
| 4,926,618 A | 5/1990 | Ratliff | |
| 5,058,388 A | 10/1991 | Shaw et al. | |
| 5,213,773 A * | 5/1993 | Burris | B01D 19/0005 210/138 |
| 5,275,643 A | 1/1994 | Usui | |
| 5,470,484 A | 11/1995 | McNeel | |
| 5,547,584 A * | 8/1996 | Capehart | C02F 1/283 210/764 |
| 5,579,647 A | 12/1996 | Calton et al. | |
| 5,701,749 A | 12/1997 | Zakryk | |
| 5,718,122 A * | 2/1998 | Maeda | F24F 3/1411 62/271 |
| 5,729,981 A | 3/1998 | Markus et al. | |
| 5,758,511 A | 6/1998 | Yoho et al. | |
| 5,826,434 A * | 10/1998 | Belding | B01D 53/261 62/271 |
| 5,846,296 A | 12/1998 | Kmmsvik | |
| 5,873,256 A | 2/1999 | Denniston | |
| 5,989,313 A | 11/1999 | Mize | |
| 6,029,467 A | 2/2000 | Moratalla | |
| 6,156,102 A | 12/2000 | Contad et al. | |
| 6,199,388 B1 | 3/2001 | Fischer, Jr. | |
| 6,336,957 B1 | 1/2002 | Tsymerman | |
| 6,447,583 B1 | 9/2002 | Thelen et al. | |
| 6,490,879 B1 | 12/2002 | Lloyd et al. | |
| 6,511,525 B2 | 1/2003 | Spletzer et al. | |
| 6,513,339 B1 | 2/2003 | Kopko | |
| 6,557,365 B2 | 5/2003 | Dinnage et al. | |
| 6,574,979 B2 | 6/2003 | Faqih | |
| 6,644,060 B1 | 11/2003 | Dagan | |
| 6,828,499 B2 | 12/2004 | Max | |
| 6,869,464 B2 | 3/2005 | Klemic | |
| 6,945,063 B2 | 9/2005 | Max | |
| 6,957,543 B1 | 10/2005 | Reznik | |
| 7,017,356 B2 | 3/2006 | Moffitt | |
| 7,043,934 B2 | 5/2006 | Raderrnacher et al. | |
| 7,178,355 B2 | 2/2007 | Moffitt | |
| 7,251,945 B2 | 8/2007 | Tongue | |
| 7,305,849 B2 | 12/2007 | Loffler et al. | |
| 7,306,654 B2 | 12/2007 | King et al. | |
| 7,478,535 B2 | 1/2009 | Turner, Jr. et al. | |
| 7,740,765 B2 | 6/2010 | Mitchell | |
| 7,866,176 B2 | 1/2011 | Vetrovec et al. | |
| 7,905,097 B1 | 3/2011 | Fort | |
| 7,926,481 B2 | 4/2011 | Edwards et al. | |
| 8,075,652 B2 | 12/2011 | Melikyan | |
| 8,118,912 B2 | 2/2012 | Rodriguez et al. | |
| 8,187,368 B2 | 5/2012 | Shih | |
| 8,196,422 B2 | 6/2012 | Ritchey | |
| 8,328,904 B2 | 12/2012 | Griffiths et al. | |
| 8,425,660 B2 | 4/2013 | Ike et al. | |
| 8,506,675 B2 | 8/2013 | Ellsworth | |
| 8,844,299 B2 | 9/2014 | Ferreira et al. | |
| 8,876,956 B2 * | 11/2014 | Ball | F25B 17/02 95/231 |
| 9,289,718 B2 | 3/2016 | Dahlback | |
| 10,357,739 B2 | 7/2019 | Friesen et al. | |
| 10,469,028 B2 | 11/2019 | Friesen et al. | |
| 10,632,416 B2 | 4/2020 | Friesen et al. | |
| 10,835,861 B2 | 11/2020 | Friesen et al. | |
| 11,159,123 B2 | 10/2021 | Friesen et al. | |
| 11,160,223 B2 | 11/2021 | Friesen et al. | |
| 11,266,944 B2 * | 3/2022 | Friesen | B01D 53/04 |
| 11,281,997 B2 * | 3/2022 | Friesen | G06N 20/00 |
| 11,285,435 B2 * | 3/2022 | Friesen | B01D 53/265 |
| 2002/0046569 A1 | 4/2002 | Faqih | |
| 2002/0130091 A1 | 9/2002 | Ekberg et al. | |
| 2003/0091881 A1 | 5/2003 | Eisler | |
| 2003/0101161 A1 | 5/2003 | Ferguson et al. | |
| 2004/0000165 A1 | 1/2004 | Max | |
| 2004/0055309 A1 | 3/2004 | Bellows et al. | |
| 2005/0044862 A1 | 3/2005 | Vetrovec et al. | |
| 2005/0084415 A1 | 4/2005 | McVey et al. | |
| 2005/0204914 A1 | 9/2005 | Boutall | |
| 2005/0249631 A1 | 11/2005 | Schulz et al. | |
| 2005/0284167 A1 | 12/2005 | Morgan | |
| 2006/0017740 A1 | 1/2006 | Coleman | |
| 2006/0032493 A1 | 2/2006 | Ritchey | |
| 2006/0060475 A1 | 3/2006 | Applegate et al. | |
| 2006/0112709 A1 | 6/2006 | Boyle | |
| 2006/0130654 A1 | 6/2006 | King et al. | |

(56) References Cited

U.S. PATENT DOCUMENTS

| | | |
|---|---|---|
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0022694 A1 | 1/2008 | Anderson et al. |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0245092 A1* | 10/2008 | Forsberg ............... F24F 1/027 62/3.4 |
| 2008/0289352 A1 | 11/2008 | Parent |
| 2008/0314807 A1* | 12/2008 | Junghanns ............ B01D 61/025 210/85 |
| 2009/0025711 A1 | 1/2009 | Edwards et al. |
| 2009/0093916 A1 | 4/2009 | Parsonnet et al. |
| 2009/0173376 A1* | 7/2009 | Spencer ............... B01D 53/261 126/569 |
| 2009/0211276 A1 | 8/2009 | Forkosh |
| 2009/0223514 A1 | 9/2009 | Smith et al. |
| 2009/0283464 A1 | 11/2009 | Oe et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0242507 A1 | 9/2010 | Meckler |
| 2010/0275629 A1 | 11/2010 | Erickson |
| 2010/0275775 A1 | 11/2010 | Griffiths et al. |
| 2010/0294672 A1 | 11/2010 | Gahr et al. |
| 2010/0300868 A1* | 12/2010 | Pirone ............... B01D 1/225 202/175 |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 | 1/2012 | Roychoudhury |
| 2012/0125302 A1 | 5/2012 | Vandermeulen et al. |
| 2012/0227582 A1 | 9/2012 | Wamstad et al. |
| 2013/0042642 A1 | 2/2013 | Ferreira et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2013/0319022 A1 | 12/2013 | Becze et al. |
| 2014/0034475 A1 | 2/2014 | Kamen et al. |
| 2014/0053580 A1* | 2/2014 | Ferreira ............... B01D 5/0039 62/140 |
| 2014/0110273 A1 | 4/2014 | Bar-or et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0260389 A1* | 9/2014 | Sistla ............... F28F 17/005 62/222 |
| 2014/0317029 A1 | 10/2014 | Matsuoka et al. |
| 2015/0033774 A1 | 2/2015 | Ferreira et al. |
| 2015/0136666 A1* | 5/2015 | Tais Zamir ............ B01D 61/08 |
| 2015/0194926 A1 | 7/2015 | Bushong, Jr. |
| 2016/0073589 A1 | 3/2016 | McNamara |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0244951 A1 | 8/2016 | Yui |
| 2016/0333553 A1 | 11/2016 | Dorfman |
| 2017/0013810 A1 | 1/2017 | Graben |
| 2017/0024641 A1 | 1/2017 | Wierzynski |
| 2017/0203974 A1 | 7/2017 | Riedl et al. |
| 2017/0323221 A1 | 11/2017 | Chaudhuri et al. |
| 2017/0354920 A1 | 12/2017 | Friesen et al. |
| 2017/0371544 A1 | 12/2017 | Choi et al. |
| 2018/0043295 A1 | 2/2018 | Friesen et al. |
| 2018/0209123 A1* | 7/2018 | Bahrami ............... B01D 5/006 |
| 2018/0369713 A1* | 12/2018 | Dorfman ............... B01D 5/006 |
| 2019/0025273 A1 | 1/2019 | Brondum |
| 2019/0102695 A1 | 4/2019 | Biswas et al. |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1 | 11/2019 | Friesen et al. |
| 2019/0372520 A1 | 12/2019 | Friesen et al. |
| 2020/0055753 A1* | 2/2020 | Minor ............... C02F 1/008 |
| 2020/0108344 A1 | 4/2020 | Vollmer et al. |
| 2020/0122083 A1 | 4/2020 | Friesen et al. |
| 2020/0124566 A1 | 4/2020 | Jolmson et al. |
| 2020/0140299 A1 | 5/2020 | Friesen et al. |
| 2020/0209190 A1 | 7/2020 | Jolmson et al. |
| 2020/0269184 A1 | 8/2020 | Friesen et al. |
| 2020/0283997 A1 | 9/2020 | Salloum et al. |
| 2020/0286997 A1* | 9/2020 | Wu ............... H01L 29/78 |
| 2020/0300128 A1 | 9/2020 | Friesen et al. |
| 2021/0062478 A1 | 3/2021 | Friesen et al. |
| 2021/0300804 A1 | 9/2021 | Broga et al. |
| 2021/0305935 A1 | 9/2021 | Friesen et al. |
| 2022/0039341 A1* | 2/2022 | Friesen ............... A01G 9/249 |
| 2022/0127172 A1* | 4/2022 | Friesen ............... C02F 1/78 |
| 2022/0136270 A1 | 5/2022 | Gamboa et al. |
| 2022/0156648 A1 | 5/2022 | Friesen et al. |

FOREIGN PATENT DOCUMENTS

| | | | |
|---|---|---|---|
| CN | 101589282 A | 11/2009 | |
| CN | 102042645 A | 5/2011 | |
| CN | 102297503 A | 12/2011 | |
| CN | 102422089 A | 4/2012 | |
| CN | 102441320 A | 5/2012 | |
| CN | 102733451 A | 10/2012 | |
| CN | 202850099 U | 4/2013 | |
| CN | 103889892 A | 6/2014 | |
| CN | 203777907 U | 8/2014 | |
| CN | 104813107 A | 7/2015 | |
| CN | 204510348 U | 7/2015 | |
| CN | 105531547 A | 4/2016 | |
| DE | 4215839 A1 | 11/1993 | |
| EP | 1139554 A2 | 10/2001 | |
| EP | 2305362 A1 | 4/2011 | |
| EP | 2326890 A1 | 6/2011 | |
| FR | 2813087 A1 | 2/2002 | |
| JP | H06-142434 A | 5/1994 | |
| JP | H09-285412 A | 10/1997 | |
| JP | 2002-126441 A | 5/2002 | |
| JP | 2003-148786 A | 5/2003 | |
| JP | 3850498 B | 11/2006 | |
| JP | 2012-101169 A | 5/2012 | |
| JP | 2012526657 A * | 11/2012 | ............... C02F 9/00 |
| KR | 20000003525 U | 2/2000 | |
| WO | WO 1999/007951 A1 | 2/1999 | |
| WO | WO 2006/129200 A2 | 12/2006 | |
| WO | WO 2007/041804 A1 | 4/2007 | |
| WO | WO 2007/051886 A1 | 5/2007 | |
| WO | WO 2008/018071 A2 | 2/2008 | |
| WO | WO 2009/043413 A1 | 4/2009 | |
| WO | WO 2012/009024 A1 | 1/2012 | |
| WO | WO 2012/128619 A2 | 9/2012 | |
| WO | WO 2012/162760 A1 | 12/2012 | |
| WO | WO 2013/026126 A1 | 2/2013 | |
| WO | WO 2013/182911 A2 | 12/2013 | |
| WO | WO 2014/085860 A1 | 6/2014 | |
| WO | WO 2015/054435 A1 | 4/2015 | |
| WO | WO 2016/053162 A1 | 4/2016 | |
| WO | WO 2016/081863 A1 | 5/2016 | |
| WO | WO 2016/138075 A1 | 9/2016 | |
| WO | WO 2016/187709 A1 | 12/2016 | |
| WO | WO 2017/177143 A1 | 10/2017 | |
| WO | WO 2017/201405 A1 | 11/2017 | |
| WO | WO-2018200388 A1 * | 11/2018 | ............... B01D 35/02 |
| WO | WO 2019/014599 A2 | 1/2019 | |
| WO | WO 2019/050861 A1 | 3/2019 | |
| WO | WO 2019/050866 A1 | 3/2019 | |

(56) References Cited

FOREIGN PATENT DOCUMENTS

| WO | WO 2019/071202 A1 | 4/2019 |
|---|---|---|
| WO | WO 2019/113354 A1 | 6/2019 |
| WO | WO 2019/161339 A1 | 8/2019 |
| WO | WO 2020/082038 A1 | 4/2020 |
| WO | WO 2020/086621 A1 | 4/2020 |

OTHER PUBLICATIONS

ACS.org [online], "A Single-Layer Atmosphere Model," Jun. 6, 2012, retrieved on Jul. 31, 2025, retrieved from URL <https://www.acs.org/content/acs/en/climatescience/atmosphericwarming/singlelayermodel.html>, 7 pages.

Ali et al., "Desiccant Enhanced Nocturnal Radiative Cooling-Solar Collector System for Air Comfort Application in Hot Arid Areas," Int. J. of Thermal & Environmental Engineering, Mar. 2013, 5(1):71-82.

Anand et al., "Solar Cooling Systems for Climate Change Mitigation: A Review," Renewable and Sustainable Energy Reviews, Jan. 2015, 41:143-161.

Critoph et al., "Solar Energy for Cooling and Refrigeration," Engineering Department, 1997, University of Warwick, Coventry CV4 7AL, United Kingdom, 10 pages.

De Antonellis et al., "Simulation, Performance Analysis and Optimization of Desiccant Wheels," Energy and Buildings, Sep. 2010, 42(9):1386-1393.

DRB-mattech.co.uk [online], "UV Exposure Across Surface of Earth," Materials Technology, 2010, retrieved on Jul. 31, 2025, retrieved from URL <http://www.drb-mattech.co.uk/uv %20map.html>, 4 pages.

Eriksson et al., "Diurnal Variations of Humidity and Ice Water Content in the Tropical Upper Troposphere," Atmos. Chem. Phys,. Dec. 2010, 10:11519-11533.

European Search Report in European Application No. 15825979, mailed on Jan. 28, 2020, 5 pages.

European Search Report in European Application No. 15825979, mailed on Jun. 7, 2019, 3 pages.

European Solar Thermal Industry Federation (ESTIF), "Key Issues for Renewable Heat in Europe (K4RES-H)," Solar Assisted Cooling—WP3, 2006, Task 3.5, Contract EIE/04/204/S07.38607:1-21.

Final Office Action in U.S. Appl. No. 16/167,295, mailed on Apr. 13, 2021, 32 pages.

Final Office Action in U.S. Appl. No. 16/791,895, mailed on Dec. 20, 2021, 29 pages.

Final Office Action in U.S. Appl. No. 16/791,895, mailed on Oct. 15, 2020, 21 pages.

Final Office Action in U.S. Appl. No. 15/528,366, mailed on Apr. 27, 2020, 21 pages.

Gad et al., "Application of a Solar Desiccant/Collector System for Water Recovery From Atmospheric Air," Renewal Energy, Apr. 2001, 22(4):541-556.

Ge et al., "A Mathematical Model for Predicting the Performance of a Compound Desiccant Wheel (A Model of a Compound Desiccant Wheel)," Applied Thermal Engineering, Jun. 2010, 30(8):1005-1015.

International Preliminary Report on Patentability in International Application No. PCT/US2022/045951, mailed on Apr. 18, 2024, 12 pages.

International Search Report and Written Opinion in International Application No. PCT/US2015/061921, mailed on Apr. 29, 2016, 10 pages.

International Search Report and Written Opinion in International Application No. PCT/US2017/026609, mailed on Jun. 19, 2017, 8 pages.

International Search Report and Written Opinion in International Application No. PCT/US2017/033540, mailed on Aug. 16, 2017, 17 pages.

International Search Report and Written Opinion in International Application No. PCT/US2018/042098, mailed on Mar. 6, 2019, 18 pages.

International Search Report and Written Opinion in International Application No. PCT/US2018/049398, mailed on Dec. 3, 2018, 10 pages.

International Search Report and Written Opinion in International Application No. PCT/US2018/049411, mailed on Dec. 3, 2018, 10 pages.

International Search Report and Written Opinion in International Application No. PCT/US2018/054715, mailed on Jan. 15, 2019, 10 pages.

International Search Report and Written Opinion in International Application No. PCT/US2018/064308, mailed on Mar. 29, 2019, 11 pages.

International Search Report and Written Opinion in International Application No. PCT/US2019/018431, mailed on Jun. 6, 2019, 11 pages.

International Search Report and Written Opinion in International Application No. PCT/US2019/057081, mailed on Mar. 19, 2020, 11 pages.

International Search Report and Written Opinion in International Application No. PCT/US2019/057492, mailed on Jan. 28, 2020, 14 pages.

International Search Report and Written Opinion in International Application No. PCT/US2019/32066, mailed on Jul. 29, 2019, 10 pages.

International Search Report and Written Opinion in International Application No. PCT/US2020/029401, mailed on Jun. 15, 2020, 14 pages.

International Search Report and Written Opinion in International Application No. PCT/US2021/015106, mailed on Apr. 6, 2021, 7 pages.

International Search Report and Written Opinion in International Application No. PCT/US2021/056910, mailed on Feb. 16, 2022, 13 pages.

International Search Report and Written Opinion in International Application No. PCT/US2022/045951, mailed on Feb. 22, 2023, 16 pages.

Invitation to Pay Additional Fees and, Where Applicable, Protest Fee in International Application No. PCT/US2022/045951, mailed on Dec. 9, 2022, 3 pages.

Kassem et al., "Solar Powered Dehumidification Systems Using Desert Evaporative Coolers: Review," International Journal of Engineering and Advanced Technology (IJEAT), Oct. 2013, ISSN: 2249-8958, 3(1):115-128.

Kolewar et al., "Feasibility of Solar Desiccant Evaporative Cooling: A Review," International Journal of Scientific & Engineering Research, Oct. 2014, ISSN: 2229-5518, 5(10):527-534.

Kozubal et al.," Desiccant Enhanced Evaporative Air-Conditioning (DEVap): Evaluation of a New Concept in Ultra Efficient Air Conditioning," National Renewal Energy Laboratory (NREL), Technical Report, NREL/TP-5500-49722, Jan. 2011, 71 pages.

La et al., "Technical Development of Rotary Desiccant Dehumidification and Air Conditioning: A Review," Renewable and Sustainable Energy Reviews, Jan. 2010, 14(1):130-147.

Nia et al., "Modeling and Simulation of Desiccant Wheel for Air Conditioning," Energy and Buildings, Oct. 2006, 38(10):1230-1239.

Non-Final Office Action in U.S. Appl. No. 15/482,104, mailed on Feb. 5, 2019, 11 pages.

Non-Final Office Action in U.S. Appl. No. 15/528,366, mailed on Jan. 17, 2020, 20 pages.

Non-Final Office Action in U.S. Appl. No. 16/167,295, mailed on Jun. 1, 2020, 29 pages.

Non-Final Office Action in U.S. Appl. No. 16/211,896, mailed on Jul. 20, 2021, 16 pages.

Non-Final Office Action in U.S. Appl. No. 16/278,608, mailed on Apr. 30, 2021, 23 pages.

Non-Final Office Action in U.S. Appl. No. 16/411,048, mailed on May 11, 2022, 9 pages.

Non-Final Office Action in U.S. Appl. No. 16/517,435, mailed on Aug. 9, 2019, 6 pages.

(56) References Cited

OTHER PUBLICATIONS

Non-Final Office Action in U.S. Appl. No. 16/630,824, mailed on Jul. 26, 2021, 22 pages.
Non-Final Office Action in U.S. Appl. No. 16/630,824, mailed on Mar. 2, 2022, 24 pages.
Non-Final Office Action in U.S. Appl. No. 16/657,935, mailed on Aug. 24, 2021, 29 pages.
Non-Final Office Action in U.S. Appl. No. 16/791,895, mailed on May 15, 2020, 21 pages.
Non-Final Office Action in U.S. Appl. No. 16/855,965, mailed on May 6, 2022, 8 pages.
Notice of Allowance in U.S. Appl. No. 15/482,104, mailed on Jun. 27, 2019, 7 pages.
Notice of Allowance in U.S. Appl. No. 15/528,366, mailed on Jun. 19, 2020, 8 pages.
Notice of Allowance in U.S. Appl. No. 15/600,046, mailed on Mar. 1, 2019, 7 pages.
Notice of Allowance in U.S. Appl. No. 16/211,896, mailed on Nov. 10, 2021, 8 pages.
Notice of Allowance in U.S. Appl. No. 16/517,435, mailed on Jan. 31, 2020, 5 pages.
Notice of Allowance in U.S. Appl. No. 16/644,465, mailed on Feb. 4, 2022, 11 pages.
Notice of Allowance in U.S. Appl. No. 16/644,487, mailed on Mar. 7, 2022, 9 pages.
Notice of Allowance in U.S. Appl. No. 16/820,587, mailed on Oct. 20, 2021, 8 pages.
Office Action in Brazilian Patent Application No. 112017021842.9, mailed on Feb. 4, 2020, 5 pages (with English translation).
Office Action in Chinese Application No. 201780033378.3, mailed on Apr. 6, 2021, 12 pages (English translation only).
Office Action in Chinese Application No. 201780033378.3, mailed on Aug. 4, 2021, 15 pages (English translation only).
Office Action in Chinese Application No. 201780033378.3, mailed on Nov. 1, 2021, 17 pages (English translation only).
Office Action in Chinese Application No. 201780033378.3, mailed on Oct. 31, 2019, 12 pages (English translation only).
Office Action in Chinese Patent Application No. 201780044144.9, mailed on Oct. 20, 2021, 8 pages (English translation only).
Office Action in India Patent Application No. 20181704169, mailed on Apr. 28, 2021, 6 pages.
Office Action in India Patent Application No. 202017005710, mailed on Jul. 29, 2021, 25 pages.
Office Action in Japanese Patent Application No. 2019-503636, mailed on Jul. 15, 2021, 9 pages (with English translation).
Pvpmc.sandia.gov [online], "Irradiance & Insolation," PV Performance Modeling Collaborative, 2014, retrieved on Jul. 31, 2025, retrieved from URL <https://pvpmc.sandia.gov/ modeling-steps/1-weather-design-inputs/irradiance-and-insolation-2/>, 4 pages.
Wahlgren, "Atmospheric Water Vapour Processor Designs for Potable Water Production: A Review," Wat. Res., Jan. 2001, 35(1):1-22.
William et al., "Desiccant System for Water Production From Humid Air Using Solar Energy," Energy, Oct. 2015, 90:1707-1720.

* cited by examiner

SYSTEMS AND METHODS FOR WATER PRODUCTION, TREATMENT, ADJUSTMENT AND STORAGE

CROSS REFERENCE TO RELATED APPLICATIONS

This application claims priority to, and the benefit of, U.S. Provisional Patent Application Ser. No. 63/253,847 filed on Oct. 8, 2021 entitled "SYSTEMS AND METHODS FOR WATER PRODUCTION, TREATMENT, ADJUSTMENT AND STORAGE", the disclosure of which is hereby incorporated by reference in their entirety.

TECHNICAL FIELD

This disclosure is related to systems and methods for water treatment, storage and customization, and more particularly, to systems and related methods for water production, sanitation, adjustment, maintenance, storage and dispensing of potable water to a user.

BACKGROUND

Certain challenges exist for water production, treatment, and storage systems for providing consistent, safe and adjustable or customizable water to a user in an automated and/or on-demand approach with high efficiency, high reliability and low cost. Consumers have come to appreciate the various options available with respect to water products (e.g., variations in taste profiles, alkalinity, minerality and/or the like) and there are a wide variety of water options (e.g., electrolyte water, alkaline water, flavored water, carbonated water and/or the like). However, especially in a household or commercial settings, there are various hurdles (e.g., space, difficulty, time, and/or inconvenience) to be overcome in easily accessing, especially on-demand, preferred choices of water to a wide range of individual users. Additionally, most households or companies comprise individuals with a range of taste preferences and can be cumbersome or inconvenient to address individual preferences to accommodate via multiple bottles or mixing solutions. Therefore, it would be desirable to employ a system to efficiently produce water and accommodate various taste preferences automatically and/or on-demand.

Furthermore, there are gaps in addressing the needs and desires of individuals looking to solve problems including: limited potable water access (e.g., remote locations far from local water sources, inconveniences of transport), poor water quality of local water supplies and unsustainable water supplies (e.g., bottled water, high cost, unpredictable or wasteful supply chains). In addition, many individuals appreciate self-sufficiency and/or ownership over their resources, especially regarding basic power and water needs. Furthermore, many individuals would have a preference for a seamless digital experience in obtaining and their preferred water. There exists a need for improved systems and methods for producing, storing and dispensing water and addressing multiple taste profiles, particularly in a consistent, safe and automatic or on-demand manner.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

Figure 1:
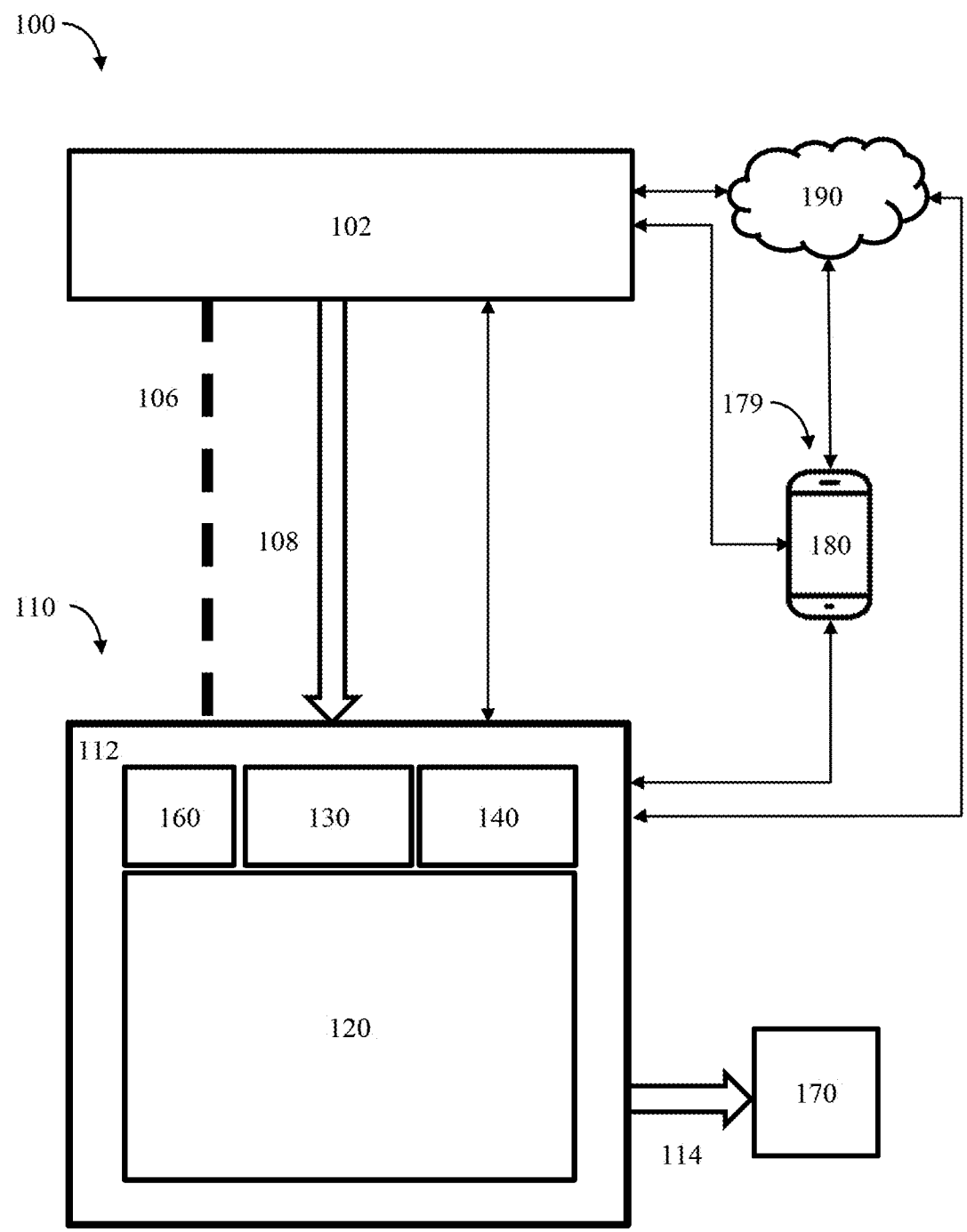
FIG. 1 depicts a system for water production, treatment, storage and customization, according to various exemplary embodiments.

For simplicity and clarity of illustration, the drawing figures may also show the general manner of construction, and descriptions and details of well-known features and techniques and thus such features and techniques may be omitted to avoid unnecessarily obscuring the invention.

Additionally, elements in the drawing figures are not necessarily drawn to scale. For example, the dimensions of some of the elements in the figures may be exaggerated relative to other elements to help improve understanding of various exemplary embodiments of the present invention. The same reference numerals in different figures denote the same elements.

DESCRIPTION OF ILLUSTRATIVE EMBODIMENTS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, electrical, chemical, and/or mechanical changes may be made without departing from the spirit and scope of the disclosure.

Thus, the detailed description herein is presented for purposes of illustration only and not of limitation. For example, the operations or steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

This disclosure includes embodiments of systems and methods, such as, for example, for water production, treatment, adjustment, storage and dispensing to a user. The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately" and "about" may be substituted with "within [a percentage] of" what is specified, where the percentage includes 0.1, 1, 5, and 10%. Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more operations or steps possesses those one or more operations or steps, but is not limited to possessing only those one or more operations or steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments or implementations, even though not described or illustrated, unless expressly prohibited by this disclosure or the nature of the embodiments.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The system may allow users to access data and receive updated data in real time from other users. The system may store the data (e.g., in a standardized format) in a plurality of storage devices, provide remote access over a network so that users may update the data in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system allows remote users to share data in real time in a standardized format, regardless of the format (e.g. non-standardized) that the information was input by the user. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account. The system may include a filter on a local computer and a filter on a server.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like. The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol. Transactions originating at a web client may pass through a firewall in order to prevent unauthorized access from users of other networks. Further, additional firewalls may be deployed between the varying components of CMS to further enhance security.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As will be described in detail below, this disclosure describes various systems and methods for generating cost-effective, reliable, sustainable and adjustable water quality solutions. The systems and methods described herein can provide several advantages including providing consistent high-quality water at point-of-use locations, thereby avoiding inconveniences of transport, unpredictable or wasteful supply chains and/or alleviate water needs at remote locations. Furthermore, the systems and methods described herein can offer a seamless digital consumer experience with high accuracy reporting of water production, storage, quality and personalization for the user.

Referring now to the drawings, and more particularly to FIG. 1, system 100 for providing water to a user comprises water production system 102 coupled to water management system 110. Water management system 110 is configured to receive water produced by water production system 102 via inbound water conduit 108 (e.g., dedicated plumb line or tubing insulated to withstand freezing conditions). Water management system 110 comprises water storage reservoir 120 configured to store water produced by water production system 102 and a sanitation unit 130 configured to disinfect or sanitize water produced by water production system 102 and/or stored by storage reservoir 120. Water management system 110 further comprises a water quality adjustment or customization unit 140 for customizing, adjusting or modifying the quality of water produced by water production system 102. In one example, water customization unit 140 can add, dissolve or inject additives, agents or other components into water of the storage reservoir 120 in advance of dispensing to a user (e.g., automatically, upon user demand) via outbound water conduit 114 and dispenser 170 (e.g., faucet, refrigerator and/or the like). In various implementations, water customization unit 140 can add one or more additives, agents or components into water entering storage reservoir 120 via inbound water conduit 108. In another example, water customization unit 140 can add additives, agents or components into water stored in storage reservoir 120 (e.g., in a recirculating manner). In some embodiments, water customization unit 140 can add additives, agents or components into produced water in various ways and under various operation conditions. That is, a combination of automatic, programmatic and/or on-demand approaches can be applied to adjust inbound water and/or recirculating water based on the desired operational approach.

In many embodiments, system 100 includes one or more processors or controllers configured to operate system 100 based on one or more of: a user selection or input, data received from sensors and/or servers, programmatic control, and/or the like, as will be described in more detail below. The processors or controllers can execute computer-executable program instructions stored in a computer-readable medium, such as a random-access memory (RAM), that can include any number of application programs to implement various methods for water production, treatment, storage, adjustment, dispensing and/or other user interactions with system 100. In addition, a controller can be adapted to receive any number of inputs or signals from one or more users, sensors, remote and/or local servers or data processing resources, client-type devices, wireless communication devices and/or the like.

In some embodiments, system 100 includes one controller for controlling the water production system 102 that is in communication with another controller for controlling a water management system 110 (e.g., controller 160). In other embodiments, a central system processor or controller can control both a water production system and a water management system.

In some embodiments, system 100 can comprise one or more telematics units (e.g., a transmitter, receiver, transponder, transverter, repeater, transceiver, and/or the like, sometimes referred to herein as "transceiver"). For example, a transceiver may be configured to communicate data to and/or from the system (e.g., via controller 160) via a wired and/or wireless interface (e.g., which may conform to standardized communications protocols, such as, for example, GSM, SMS components operating at relatively low rates (e.g., operating every few minutes), protocols that may be geographically specified, and/or the like). One or more transceivers may be associated with a server and a communications network (e . . . , 190) for communicating information between the server and the transceiver (e.g., and thus the system 100 and/or associated controller(s) thereof). Two-way communication may be facilitated by a cellular tower in cellular range of the system and/or short-range communications like Bluetooth. In some embodiments, a database (e.g., which may be remote from the system) may be configured to store information received from the server over the communications network. A remote server in communication with the system and the user interface, can comprise a memory and a processor comprising various functions including but not limited to: administration functions to retrieving information from the controller relating to characteristics of water production, water usage and water quality; and/or water profile or recipe suggestion functions, wherein the water profile suggestion function causes the processor to compare previously stored data indicative of a water profile setpoint history to previously stored suggested water profiles in the remote server.

As depicted in FIG. 1, water production system 102 and water management system 110 can be in communication via a network 190 (e.g., Internet, global network, local area network and/or the like) including one or more servers, data processing resources and/or databases. A user water management system 179 can be operable through a user interface 180 interact with a user by way of any number of devices, for example a personal computer (PC), a wireless communication device, a wireless data processing device, a wireless phone, a mobile phone and/or the like. In various implementations, water management system 110 and water production system 102 can be configured to communicate via one or more of: a cellular network, wireless area network (WAN), Wifi network, satellite network, a mesh network, a wired communication interface like a controller area network (CAN), short-range wireless technologies like Bluetooth and/or the like. One or more communication interfaces (e.g., such as depicted in solid arrows in FIG. 1) can be employed to facilitate communication between water production system 102, storage reservoir 120, sanitation unit 130, customization unit 140, controller 160, dispenser 170, user interface 180 and/or network 190.

In various embodiments, components, modules, and/or engines of user water management system 179 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the controller 160 can be configured as a central network element or hub to access various systems and components of the water management system 110. In various embodiments, the controller 160 can comprise a processor. In various embodiments, the controller 160 can be implemented in a single processor. In various embodiments, the controller 160 can be implemented as and may include one or more processors and/or one or more tangible, non-transitory memories (e.g., memory) and be capable of implementing logic. Each processor can be a general-purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. The controller 160 can comprise a processor configured to implement various logical operations in response to execution of instructions, for example, instructions stored on a non-transitory, tangible, computer-readable medium configured to communicate with the controller 160. In various embodiments, the user water management system 179 can communicate with the controller 160 (e.g., through the network 190 or the like).

System program instructions and/or controller instructions can be loaded onto a non-transitory, tangible computer-readable medium of the controller 160 having instructions stored thereon that, in response to execution by a processor of the controller 160, cause the controller 160 to perform various operations.

Depending on the installation site and type of networking available, various modes of operation can be employed. For example, a Wifi network can be implemented in a Client mode wherein an onsite wireless router is designated as the access point (AP). In other implementations, an access point mode can be employed wherein a water production system or water management system is designated as an Access Point. In another example, in "dark" installation sites without WiFi or cellular connectivity, a water production system or water management system can act as a local access point, in which case communication to external networks (e.g. 190) are unavailable and the components of system (e.g., 100) communicate in an islanded manner.

In an embodiment, one or more users can access network 190 and/or directly communicate with sub-systems, units or components of system 100 (e.g., via Wifi, Cellular, I2C, CANBUS and/or the like) through interface 180 of user water management system 179. In various embodiments, one or more users can, through network 190 or via direct communication with sub-systems or units of system 100 (e.g., water production system 102 and water management system 110) to set or configure water preferences or profiles, set or configure system operational modes (e.g. quiet mode, power save mode, hibernation mode, test mode, maintenance mode), access respective accounts, access administrative functions, integrate with other applications, receive scheduled and/or non-scheduled maintenance alerts, receive information relating to system operational status, receive current, historical and/or or forecast operational information and/or receive water-related information including but not limited to: water production, water storage level, water usage, water quality, water recipes and/or the like. Furthermore, users can receive promotions, purchase compatible system components, upgrades or replacement parts, and/or sign up for other types and kinds of opportunities and services as can be required or desired.

In many embodiments, water production system 102 can generate or produce the water made available to water management system 110 by water production system 102 for treatment, storage, adjustment, customization and/or dispensing of produced water to a user. In some of these embodiments, water production system 102 can be devoid of a public water supply and/or a water collector (e.g., a rain collector, a fog net, etc.). For example, in some embodiments, water production system 102 can comprise one or more water generating units (e.g., water generating unit 204a-d of FIG. 2 or water generating unit 304 of FIG. 3) configured to generate water from ambient humidity, each having an onboard controller. Water production system 102 can be provided as an atmospheric water generator or a water-from-air solar panel. In some embodiments, water production system 102 can store firmware that is executed by one or more water production system processors or controllers (e.g., which can be integrated into, or in communication with, the water production system 102 to perform some or all of the functions associated with the water production system 102 described herein.

In one implementation, water production system 102 is provided as one or more atmospheric water generators (e.g., 204) including a solar thermal panel, a desiccation unit, and a condenser. For example, each water generation units (e.g., 204a-d) in an array can be configured to direct water generated therein to the storage reservoir via one or more liquid water conduits. For example, the water production system can be implemented as an array of water generation units connected via a system of water conduits in a linear, semi-linear, hub-and-spoke, or "daisy-chain" type of configuration. In one such implementation, water production system 102 can cycle a regeneration fluid (e.g., in a closed loop) between the solar thermal panel, the desiccation unit and the condenser to produce water from a process fluid (e.g., ambient air). The condenser of water production system 102 can condense water vapor from the regeneration fluid and supply the condensed water to water management system 110 for treatment, storage, customization, and/or dispensing.

Figure 3:
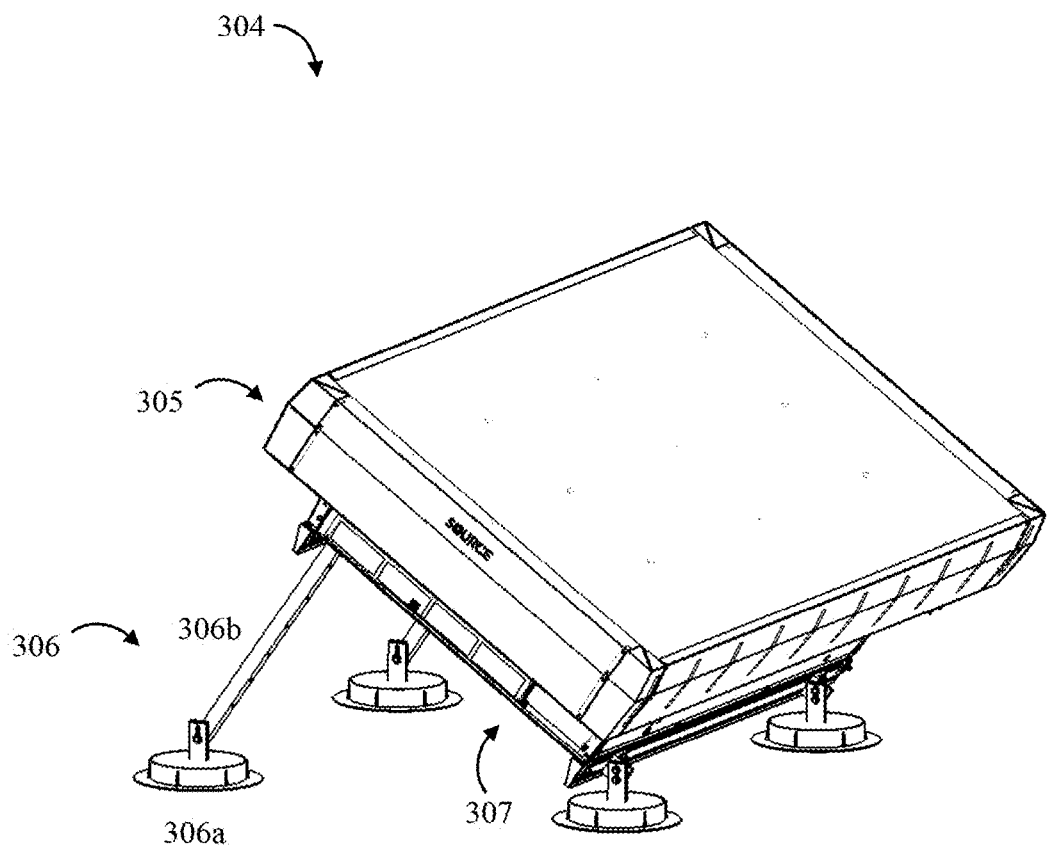
FIG. 3 depicts a water generation unit of a water production system, according to an exemplary embodiment.

In one embodiment where the water production system (e.g. 100, 200) comprises one or more water generating units (e.g. 204) for generating liquid water from a process gas containing water vapor, for example ambient air at atmospheric pressure. FIG. 3 depicts an exemplary water generating unit or "hydropanel" 304 comprising a solar unit 305 configured to absorb solar energy (e.g., from solar insolation during the day) for conversion to thermal and/or electrical energy (e.g., via a PV panel) above and coupled to a lower housing assembly 307. The lower housing assembly 307 can comprise a compact, integrated exchanger and condenser unit.

One or more water generating units (e.g., 304) can be installed or mounted above a ground surface or rooftop via a mounting assembly such as 306. In some embodiments, water generation system 304 can be mounted on a tracking assembly (e.g., single axis solar tracker, multi axis solar tracker and the like) configured to track movement of the sun to maximize thermal energy input to the solar thermal unit. In other embodiments, such as depicted in FIG. 3, mounting assembly 306 can be configured to position panel 304 in a fixed tilted configuration i.e., at a slight angle relative to the ground surface or rooftop, for example toward the southern sky for an installation in the Northern Hemisphere, or toward the northern sky for an installation in the Southern Hemisphere. The descriptive terms used herein such as front, rear, above, below, top, bottom, over, under, etc. are used to aid understanding of the invention are not used in a limiting sense. Furthermore, the directions north, south, east and west may be used herein assuming the installation site is in the Northern Hemisphere, however opposite directions can be used for installations in the Southern Hemisphere without departing from the spirit and scope of the present disclosure.

As depicted in FIG. 3, mounting or support assembly 306 comprises a plurality of support feet or surface mounts 306a supporting a plurality of support arms or members 306b at a height above a flat roof or ground surface. In the example shown, the support arms or members 306b on a generally north side have a height greater than those positioned on a generally south side. As such, the front surface of system 304 (i.e. front surface of solar thermal unit 305) is oriented at fixed tilt angle to face a southern direction. The northern edge of lower housing assembly 307 is supported above north side support arms or members 306b to facilitate access to panels located on generally north, east and west sides of system 304, thereby facilitating maintenance and serviceability. However, other configurations are also possible, for example a mounting assembly configured to power a water generating unit (e.g., 304) above a slanted or angled roof can be employed.

In various embodiments, a solar thermal unit 305 comprises one or more interstitial layers below a top cover layer for collecting solar radiation. In one example, the one or more interstitial layers can comprise an assembly including one or more photovoltaic (PV) panels for converting solar insolation to electrical energy, one or more glazing layers or a combination thereof. Solar thermal units (e.g., 305) of the present disclosure convert solar insolation to thermal energy by transferring energy from sunlight to a regeneration fluid, heat absorbing fluid or working fluid that flows through the solar thermal unit. In some embodiments, the solar thermal unit is configured at least partially as a solar photovoltaic unit which converts solar insolation to both electrical and thermal energy. In at least some examples, solar thermal units of the present disclosure may be configured such that the temperature gradient increases along the depth of the solar thermal unit, in the direction that a heat absorbing fluid flows along a regeneration flow path within the solar thermal unit. This may result in heat being substantially extracted or directed away from the upper layers of the system, such as a glazing layer that has contact with ambient air, keeping such layers relatively cool. A regeneration flow path of the solar thermal unit can be configured to direct a regeneration fluid or working gas to collect heat from a glazing layer, one or more interstitial layers disposed below and spaced apart from a glazing layer or a combination thereof. A lower housing assembly (e.g. 307) can include a distinct or integrated energy exchanger unit and condenser unit inside a housing configured to be coupled to ports of the solar thermal unit 305. In one example, an integrated exchanger and condenser unit can comprise one or more rotary desiccant wheels configured to transfer moisture, heat or a combination thereof from a plurality of regeneration flow path segments between the solar unit 305 and lower housing assembly 307. In one example, the water production system can comprise one or more water generation units, for example as described in U.S. Provisional Application No. 63/139,216, filed Jan. 19, 2021 entitled "IMPROVED SYSTEMS AND METHODS FOR GENERATING WATER FROM AIR," which is hereby incorporated by reference in its entirety. In some embodiments water generation units can comprise additional features for noise dampening or other moderating features designed for a particular installation location. For example, water generation unit can comprise an acoustic box or muffler, for example including foam materials, to reduce noise from internal components (e.g., water uptake fans, condenser cooling fans and/or the like) so as to operate the water production system at or below a predetermined noise threshold (e.g., approximately at or below 65 decibels from 1 meter distance).

In an embodiment, a water production system can operate and/or generate power, at least partially, by solar energy. In some embodiments, a system includes a water production system powered and operating entirely by solar energy, e.g., solar thermal and solar photovoltaic, and a water management system including a sanitation unit and a water customization unit that is powered by grid power, e.g., standard 110V/220V household power. In another embodiment, a system includes a water management system configured to be powered, optionally or at least partially, by an associated water production system, for example via an electrical connection like an AC or DC power electrical conduit or line (e.g., 106). An electrical connection between a water production system and a water management system should be configured to have a voltage drop low enough to power the water management system based on the physical distance therebetween.

In some embodiments, a water management system can be configured to be powered by both grid power and a water management system such that the power source can be altered based on a user input, data received from sensors and/or local or remote servers, programmatic control and/or other condition, for example a grid power outage. In various embodiments, a controller (e.g., 260), can operate the water management system (e.g., 210) between a plurality of power modes, for example between a water production system or "Hydropanel" powering mode, wherein one or more water generation units (e.g., 204*a-d*) provide a regulated output to the water management system (e.g., 210) to directly power or charge its battery and a "Grid-power mode" wherein standard 110V/220V household power directly powers or charges a battery of water management system (e.g., 210).

System 100 may further comprise one or more energy storage devices (e.g. batteries) to power the water production system (e.g., when solar energy is not available) and/or the water management system or more particularly, the sanitation unit and the water customization unit. In some implementations, a battery associated with the water management system can be charged, optionally or at least partially, by one or more water generating units comprising photovoltaic panels. In one example, a battery associated with the water management system can be activated in the event of a power outage, i.e., when grid power is unavailable.

In various embodiments, storage reservoir 120, sanitation unit 130, customization unit 140 and controller 160 can be housed collectively in housing assembly 112 of water management system 110 as illustrated in FIG. 1. In some embodiments, components in water management housing assembly 112 can be physically separate from other components of system 100. As an illustrative non-limiting example, water management system 110 can be located in a garage or utility closet of a home, whereas dispenser 170 can be located remotely from the water management system, for example in a kitchen of the home, such that outbound water conduit 114 directs water from water management system 110 to dispenser 170 for consumption by a user. As another non-limiting example, water production system 102 can be located remotely from water management system 110, for example on a roof of the home, such that inbound water conduit 108 directs produced water from water production system 102 to water management system 110. However, many other configurations are also possible depending on installation site or other preferences.

In various embodiments, sanitation unit 130 can generate an oxidizing compound, for example ozone or ionized gas such as but not limited to oxygen or nitrogen and oxygen, and apply the oxidizing compound to water produced by water production system 102. Controller 160 can control sanitation unit 130 to treat water with the oxidizing compound such as, for example, to improve disinfection and storage of the water with the oxidizing compound, such as ozone. For example, in some embodiments, controller 160 can control the amount of ozone generated, when the ozone is generated and/or at which location in system 100 the water is treated with the ozone. Sanitation unit 130 can include one or more disinfection or oxidation units (e.g., ozone generators, ozone injectors, venturi, sparger tube, UV lamps, UV irradiators, ozone generator control system, an energy source, a transformer, a blower for inputting feed gas like air, and/or the like) at one or more locations of water management system 110 to expose the water to disinfecting or oxidative conditions (e.g., ozone, UV radiation, and/or the like).

In various embodiments, sanitation unit 130 comprises an ozone generator and an ozone generator controller (either in communication with or as part of controller 160). Further, sanitation unit 130 can comprise one or more ozone injectors (e.g. spargers, venturi tubes, and/or the like) and one or more ozone sensors. The sanitation unit can generate ozone from a feed gas including oxygen (e.g., air, oxygen concentrator and the like). Accordingly, sanitation unit 130 can comprise any suitable or desirable device configured to generate ozone. In some embodiments, sanitation unit 130 can comprise an ultraviolet ozone generator. In other embodiments, sanitation unit 130 can comprise a corona ozone generator. For example, in these embodiments, in order to generate ozone, sanitation unit 130 can generate an electric field and pass the feed gas through the electric field, thereby causing some diatomic oxygen molecules to dissociate into oxygen atoms that attach to other diatomic oxygen molecules to form ozone. Employing a corona ozone generator may be a preferred approach to generate a significant amount of ozone. Ultraviolet radiation of oxygen or an oxygen containing gas can be used to generate ozone, but the concentration of generated ozone may be below the level of ozone produced by a corona discharge generator and thus, unsuitable for entrainment of ozone in water.

In some embodiments, system 100 can employ a combination of ozone generation/injection and ultraviolet (UV) radiation to kill any microorganisms present and/or oxidize any undesirable compounds in the source water or that may form during storage. Not to be bound by any particular theory, but an oxidizing agent can kill microbes by a DNA/RNA excitation and scission mechanism and/or oxidize organic contaminants in water via ozone (O3) or hydrogen peroxide (H2O2). The sanitation unit can be configured to expose water in the inbound flow path (e.g., 108) to ozone and/or UV radiation in advance of the flow to storage reservoir (e.g., 120), expose water in a recirculation flow path of the water management system (e.g., 110) including the storage reservoir (e.g., 120), expose water in an outbound or dispensing flow path (e.g. 114) or a combination thereof.

Water management system 110 (e.g., via sanitation unit 130 and controller 160) can be configured to adjust or maintain the quantity of ozone or efficiency of ozone exposure in water of water management system 110. For example, ozone disinfection efficiency can be measured using a CT value (ozone concentration multiplied by exposure time). Water management system 110, for example via controller 160, can be configured to maintain a CT value in the range of about 0.2 to 5.5 as a function of temperature in the range of about 50° C. to 5° C., respectively, such that a 6-log inactivation of giardia cysts is possible. As another example, water management system 110 can be configured to maintain a concentration of ozone above or below a predetermined concentration value (e.g., above 0.1 ppm, below 1 ppm, below 10 ppm, below 100 ppm or other upper or lower limit based on the desired processing time).

The water management system can be configured to reach any desirable ozone ppm or CT value. Furthermore, the system can be configured to reach a target CT value, for example based on the inbound water flowrate and/or storage reservoir level. As another example in the case of recirculating water of the storage reservoir, the system can be configured to target a CT value based on the duration of recirculation operation, which can be determined based on water volume in the storage reservoir and an assumed degradation rate of ozone. In an embodiment, the system can be configured to reach or target a particular CT value (e.g., 2) at intervals throughout the days rather than consistently maintain a particular CT value. In one example, the system can be configured to recirculate water during a morning time duration before inbound water is received (e.g. from solar thermal water production) and then again towards the end of the day, or evening duration, after the majority or all of inbound water has been received for the day. In another example, the controller can determine the water level in the storage reservoir and determine if a predetermined time period has lapsed since the previous sanitation event; and in response, activate the sanitation unit based on the water level in the storage reservoir if the predetermined time period has lapsed.

In some implementations, water management system 110 can be operatively coupled to water production system 102 to sanitize water in production unit 102 before being directed to water management system 110 via inbound flow path 108. Furthermore in some implementations, when a process fluid (e.g., ambient air) is used by water production system 102 includes oxygen, an ozone generator of water management system 110 can use the process fluid exhausted by water production unit 102 as the feed gas from which sanitation unit 130 generates ozone. Using the exhaust process fluid as the water management feed gas can be advantageous because the exhausted process fluid can be dehumidified by operation of a desiccation unit of water production system 102, and dehumidifying the feed gas can be helpful to mitigate or eliminate the formation of nitric acid by sanitation unit 130, thereby mitigating corrosion of components in system 100. In some embodiments, dehumidifier components can be associated with or part of an ozone generation unit to prevent nitric acid formation.

In various embodiments, the water received by water management system 110 from water production system 102 via conduit 108, can have a soft water quality, lacking a user-preferred taste quality, insufficient pH buffering capacity and/or low pH which can be common, for example, if the produced water is generated from atmospheric water, a distillation or desalination process, an electrolytic process or an osmotic process. As such, water management system 110 can be configured to add one or more additives to change water quality so as to impart a flavor or texture to the produced liquid water. Water containing certain threshold amounts of minerals like calcium and magnesium can be preferable for consumption by a user (e.g., drinking, cooking). For potable water usage by a user of system 100, it can be necessary or desirable to treat the water by mineralization, i.e., adding minerals, and/or addition of pH-buffering salts. In various embodiments, water management system 110 is configured to mineralize water received from water production system 102. As will be described in more detail below, water management system 110 can be configured to adjust, measure and/or report various water quality parameters including but not limited to: water temperature, mineral content, pH, acidity, alkalinity, total hardness, conductivity, calcium concentration, magnesium concentration, $CO_2$ concentration, microbe concentration or presence, oxidizing agent concentration or presence, total dissolved solids (TDS) and turbidity.

Water management system 110, or more particularly adjustment or customization unit 140, can be configured to introduce, inject, dissolve, add and/or maintain one or more additives in water management system 110 in advance of dispensing water to a user. In some embodiments, such additives can be configured to dissolve slowly into water flowing in water treatment flow path and/or storage reservoir, for example via a solid or particulate mineral. Furthermore, such additives can be configured to be injected in or added to water in water management system 110, for example via a mineral slurry. Additives suitable for use in the present systems include, but are not limited to, minerals, salts, electrolytes, nutrients, pH buffering agents, carbonation agents, other water additive compounds, and/or the like. To illustrate, such additives may be selected from the group consisting of: potassium salts, magnesium salts, calcium salts, sodium salts, fluoride salts, carbonate salts, iron salts, chloride salts, sulfate salts, silica, limestone, carbon dioxide generating compounds derivatives and/or combinations thereof. Additional non-limiting examples include: calcium carbonate, calcium chloride, magnesium carbonate, magnesium oxide, magnesium sulfate, dolomitic limestone, calcareous dolomite, dolomite, potassium hydrogen carbonate, potassium bicarbonate, sodium hydrogen carbonate, and derivatives or combinations thereof.

In some embodiments, the water treated by system 110, e.g. dispensed from storage reservoir 120 via dispensing outlet 114, can be similar to "mineral water" i.e. purified water with additive minerals. In some implementations, dispensing outlet 114 can include a water polishing filter to remove low concentrations of dissolved material, gases and/or small particulate materials in advance of dispenser 170. In some embodiments, the additive or customization unit 140 is configured to treat water to less than 500 ppm total dissolved solids (TDS) content for dispensing to a user. In other embodiments, the water dispensed to the user has between about 50 and 150 ppm of TDS content. In yet other embodiments, the dispensed water has between about 250 ppm and 300 ppm TDS content.

Figure 2:
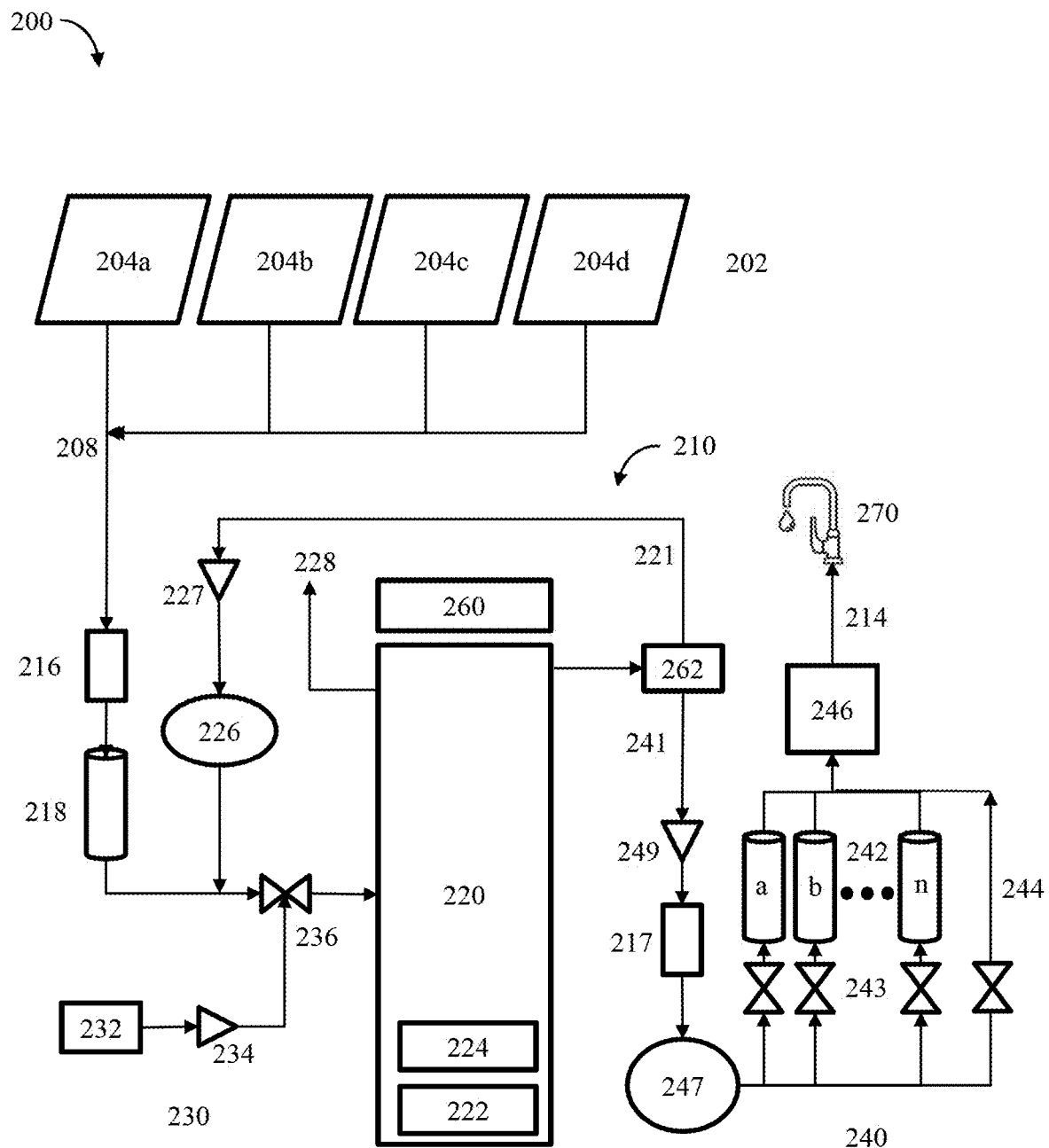
FIG. 2 depicts a system for water production, treatment, storage and customization, according to various exemplary embodiments.

As another example, FIG. 2 depicts a system 200 according to another embodiment. Unless otherwise specified below, the numerical indicators used to refer to the components or features in FIG. 1 are similar to those used to refer to components or features in FIG. 2-10, except that the index has been incremented by 100.

In various embodiments, a water additive, mixing, adjustment or customization unit (e.g., 240) is configured to customize, adjust or modify water produced by water production system (e.g., 202). In one example, water customization unit 240 provides or imparts a plurality of additives or agents into water in advance of directing to dispenser 270 via outbound water conduit 214. A processor or controller, such as 260, can be in communication with customization unit 240 to control, monitor, adjust and/or track the addition, flow, and/or removal of some or all of the water additives or agents.

In various embodiments, the controller 260 can be configured as a central network element or hub to access various systems and components of the water management system 210. In various embodiments, the controller 260 can comprise a processor. In various embodiments, the controller 260 can be implemented in a single processor. In various embodiments, the controller 260 can be implemented as and may include one or more processors and/or one or more tangible, non-transitory memories (e.g., memory) and be capable of implementing logic. Each processor can be a general-purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. The controller 260 can comprise a processor configured to implement various logical operations in response to execution of instructions, for example, instructions stored on a non-transitory, tangible, computer-readable medium configured to communicate with the controller 260.

As depicted in FIG. 2, customization unit 240 comprises a set of additive vessels, reservoirs or cartridges 242 (individually indicated as 242a, 242b and 242n) and a bypass water line or conduit 244 configured to bypass the additive vessels, reservoirs, or cartridges 242 of water customization unit. 240. In one embodiment, each additive cartridge 242 can comprise a unique additive or combination of additives in a solid or particulate form configured to dissolve into water upon flowing therethrough. Water customization unit 240 can include a set of proportional valves 243 (e.g., solenoid valves) associated with each additive cartridge 242a-n to proportion water flow through an associated additive cartridge in advance of a mixing valve or unit 246. In other embodiments, additive reservoirs or cartridges can include additive solutions or slurries, each operatively coupled to an associated pump (e.g., peristaltic pumps), respectively. In some implementations, a bypass line (e.g. 244) is provided to flow unmodified water from storage reservoir 220 to mixing unit 246.

Customization unit 240 can comprise a set of receptacles or mountings capable of receiving or mounting to a respective additive cartridge, package or other additive supply. In one non-limiting example, an additive cartridge can be manufactured as a packed bed of mineral particulate material secured in a rigid plastic container allowing facile insertion and replacement into a compatible receptacle (e.g. push connections and/or the like). As another example, an additive reservoir can be configured as a liquid mineral slurry secured in a container pouch allowing replaceability. When inserted into the associated additive cartridge receptacle at least one associated fitting can allow water to flow through the contents or allow the contents to be pumped or otherwise directed or metered by controller 260.

The water stored in a storage reservoir, containing produced water from the water production system, can have a soft water quality, low pH and/or lack sufficient minerals for dispensing to a user as drinking water. In an embodiment, additive customization unit can be configured to form or generate water having a desired or predetermined water profile or formulation parameter by directing water in the storage reservoir through the set of additive cartridges 242, then blending or mixing, via mixing unit 246, water output from the set of additive cartridges and then dispensing to a user via dispenser 270. In another embodiment, additive customization unit 240 can be configured to generate water having a desired or predetermined water profile by directing water in the storage reservoir through the bypass water line 244 in addition to the set of additive cartridges 242, in advance of mixing, via mixing unit 246, and dispensing to a user via dispenser 270. In one example, the controller 260 can be configured to determine if a pH value of the water in the storage reservoir is below a predetermined threshold. In response to determining the pH value of the water in the storage reservoir 220 is below the predetermined threshold, the controller 260 can activate the water customization unit 240 to provide one or more pH adjusting compounds into water of the storage reservoir 220.

In some embodiments, water produced by the water production system can be treated, adjusted or mineralized in advance of the water customization unit, for example to establish a baseline or balanced water profile having sufficient minerals for dispensing to a user as drinking water. In some implementations, water management system 210 can include an inbound additive cartridge 218 configured to impart additives into water directed from water production unit 202 into storage reservoir 220 via inbound water conduit 208. In another example, the storage reservoir 220 comprises a submerged additive pouch or packet 222 configured to slowly dissolve an additive into water stored in the storage reservoir. For example, additive packet 222 can be manufactured as a porous container or pouch allowing dissolution of a mineral particulate secured therein. In such embodiments, generating water can comprise dispensing a baseline water profile to a user via directing all water flow through bypass line 244 to dispenser 270 via outbound water conduit 214. Generating customized water can further comprise, for example based on a user selection or input, adjusting the baseline water profile by proportioning water flow between the set of additive cartridges 242 and bypass line 244 and mixing, by mixing unit 246, the water output from the set of additive cartridges and the bypass line to form water having an adjusted water profile for dispensing to the user. As such, the dispensed water profile can range between a baseline water profile and a fully customized or adjusted water profile, such that baseline water profile is formed by bypassing the set of additive cartridges 242 via the bypass line 244, and the fully adjusted water profile is formed by flowing water through the set of additive cartridges 242 in absence of water flow through the bypass line 244.

In an embodiment, a user can select between a range of customized or adjusted water profiles, for example water profiles associated with a threshold or ratio of characteristics including water pH, water mineral content, carbonation and/or the like. Controller 260 can adjust, based on a user input, an operational setpoint of the water customization unit 240 by adjusting a proportioning setpoint of proportional valves 243 associated with one or more additive cartridges 242 and/or the bypass line 244. In one illustrative example, the user input can prompt or set, an alkaline or high pH water profile operational setpoint such that valve 243 directs water flow through one of the additive cartridges (e.g., 242a) comprising an additive that increases the pH of water (e.g., greater than about pH 8 or 9) upon flow therethrough. The alkaline water profile operational setpoint could also include water flow through the bypass line 244 in addition to the alkaline additive cartridge 242.

Any suitable number or type of pumping devices, for example actuated by controller 260, can be provided to pump water from water production system 202, into storage reservoir 220, through a recirculation flow path, such as 221 (if present), through water customization unit 240 and to dispensing unit 270. As depicted in the example of FIG. 2, pump 226 is provided along recirculation flow path 221 and pumping device 247 is providing along flow path 241 in advance of water customization unit 240. In other embodiments, a single pumping device can be employed or more than two pumping devices can be employed. Furthermore, water production system 202 can comprise one or more pumping devices, for example associated with each water generating unit 204a-d. Additionally, any desirable number of one-way or check valves can be provided, such as valves 227, 234, and 249 depicted in FIG. 2, however other configurations and components for controlling and directing water flow through system 200 can be provided.

In several embodiments, system (e.g., 100, 200) can comprise meters, sensors or other devices configured to meter or sense water quantities or conditions in the system. Various meters or sensors can be provided at different locations throughout the system (e.g., 100, 200), for example in the water production system (e.g., 102, 202), water flow paths between components (e.g. 108, 208, 114, 214, 221), and water management system (e.g., 110, 210) including storage reservoir (e.g., 120, 220), sanitation unit (e.g., 130, 230) and/or customization unit (e.g., 140, 240). For example, one or more flowmeters or sensors in system (e.g., 100, 200) can sense or monitor a water quality parameter, a water flow rate, total water inflow, total water outflow, total amount of water in system at any given time, a water level, a water production rate, a water usage rate, and/or the like. In an example, flowmeter 216 can meter water transferred from water production unit 202 to water management system 210. Alternatively or in combination, one or more flowmeters can be provided as part of water production system 202, for example at each water generating unit 204a-d. In another example, flowmeter 217 can meter water transferred from water storage reservoir 220 to additive unit 240 and/or dispenser 270, although other configurations are also possible. Furthermore, detection of water conditions by one or more meters or sensors associated with system (e.g., 100, 200) may occur in real time and can be used by controller (e.g., 160, 260) to determine one or more operational setpoint of the system.

In various embodiments, one or more flow meters (e.g., 216, 217) can measure the flow rate of water in the inbound flow path 108, 208 and/or outbound flow path 114, 214. Based on flow rate(s) of water in system 100, controller 160 can activate or modulate various components (e.g., sanitation unit 130 when produced water is received), communicate or log water treatment and production data (e.g., revenue grade measurements for billing an end user), or a combination thereof. In one example, controller 160 can determine if a flow rate of water input to inbound flow path 108, 208 from water production system 102, 202 has reached a predetermined threshold. In response, controller 160, 260 can activate sanitation unit 130 upon reaching the predetermined threshold of water input from water production system 102, 202. Optionally, controller can activate disinfection of recirculation flow path 221 via sanitation unit 130, 230 (e.g., closed loop ozonation) upon reaching the predetermined threshold of water input from water production system 102, 202.

The drinking water system can be configured to withstand and survive extreme external environmental conditions (e.g., high or low ambient temperatures), for example via operating the system in a hibernation mode and/or features to minimize or mediate failures due to extreme environmental conditions. In some embodiments, sanitation unit of water management system can generate gases in the operation of the system, for example ozone to sanitize water, that may need to be safely exhausted, or otherwise moderated or remediated. As such, water production system, water management system and conduits therebetween can include one or more features to facilitate expansion, contraction, ventilation, survival of extreme environmental conditions, and/or other type of mediation. In one example, storage reservoir 220 can include one or more exhausts, vents or auxiliary outlets, such as outlet 228, to vent gases contained in storage reservoir 220 and/or to provide a conduit for water overflow (e.g. during expansion as a result of a freezing event or condition) or a combination thereof. In another example, a vent or auxiliary outlet can include a moderating material or filter (e.g., a carbon disproportionation fit configured to scrub any ozone exhaust). For example, a hydrophobic filter membrane can be provided, for example situated at a T-valve or joint in a vent or overflow line (e.g., 228) to allow for dedicated gas venting when the vent or overflow line is frozen, for example at a location exiting the building or residence when the water management system is installed indoors. One or more exhausts, vents or auxiliary outlets, can be provided at various locations of the system, for example at storage reservoir (e.g., 220), sanitation unit (e.g., 230), customization unit (e.g., 240 including but not limited to an additive cartridge 242), a system conduit (e.g., inbound water conduit 208, recirculation line 221 and/or the like) to provide a conduit for water overflow, freeze protection, gas venting or depressurization, or a combination thereof.

Various approaches can be employed to ensure the drinking water system withstands and survives freezing conditions. In one example, a system controller can activate one or more valves (e.g., solenoid valves) to remove or pump water from the storage reservoir to a safe threshold water level that can withstand freezing. In some cases, water can be pumped out of some or all dispense line components (e.g., proportional valves, mineral cartridges, polishing filter, etc.), and back to the storage reservoir via a T-valve or joint in advance of the dispenser 170 (e.g., faucet). Water can then be pumped out of one or more vent lines (e.g., 228), during which air can be flushed through some or all dispense line components to remove water, thereby avoiding expansion damage during freezing. As another example, a system controller can activate one or more valves (e.g., solenoid) to remove or pump water from the storage reservoir down to a safe threshold water level that can withstand freezing. Water can be pumped out of one or more vent lines, during which water is flushed out of some or all dispense line components (e.g., proportional valves, mineral cartridges). This approach can relieve pressure on the downstream dispense line to the dispenser, thereby protecting downstream components (e.g., polishing filter) from freeze damage. As yet another example, a system controller can activate one or more valves configured to relieve pressure from downstream water conduit or lines (e.g., dispense line 114), and pump air through downstream components (e.g. customization unit including mineral cartridges and proportional valves) so as to remove water from those components. In an additional example, a system controller can activate one or more valves configured to relieve pressure from a downstream dispense line including customization unit components (e.g., mineral cartridges, proportional valves, polishing filter(s), tubing and so on).

In various embodiments, system 200 can include a sensor to detect or measure a water quality conditions or parameters, for example the presence or concentration of an oxidizing compound or microbes in water of system 200. In one example, a sensing or measurement device, such as 262, can be provided to measure a quantity or concentration of ozone in water. In various embodiments, the measurement device can be further configured to measure pH of the water. Furthermore, the measurement device can be further configured to measure an ion concentration or TDS of water. In one example, the measurement device can be an electrochemical ozone sensor, for example as described in PCT International Application No. PCT/US2019/57492, filed Oct. 22, 2019 entitled "SYSTEMS AND METHODS FOR DETECTING AND MEASURING OXIDIZING COMPOUNDS IN TEST FLUIDS," which is hereby incorporated by reference in its entirety.

In some embodiments, system 200 can include oxidizing agent or microbial sensor(s) that can detect and/or measure sanitation quality of water in storage reservoir 220, inbound water flow path 208, outbound water flow path 214 and/or recirculation flow path 221. For example, microbial sensor(s) can detect and/or measure ozone or micro-organisms proximal to (e.g., within about 2 meters of, within about 10 meters of, within about 50 meters of, or in between) or at a location where ozone is generated or injected into water treatment path 221 (e.g., via ozone generator 232, check valve 234 and venturi 236 of sanitation unit 230). In some embodiments, microbial sensor(s) can comprise an impedance sensor. In some embodiments, microbial sensor(s) can be electrically coupled to an ozone generator control system (e.g., as part of generator 232 or controller 260) to provide notifications of detected micro-organisms and/or measurements of micro-organism concentration or presence. In various embodiments, system 200 can include an ozone scheduling system, for example as part of controller 260, that can cause ozone generator 232 to generate ozone as a function of the microorganism presence or concentration, lethality time and/or water level of storage reservoir. In some embodiments, an ozone scheduling system can receive the micro-organism concentration from microbial sensor(s).

In the embodiment depicted in FIG. 2, ozone is generated or injected into water treatment path 221 via ozone generator 232, check valve 234 and venturi 236 of sanitation unit 230. However, other configurations are also possible. In another example, ozone can be generated or injected into a dedicated ozone treatment path separate from water treatment path 221 and/or directly into storage reservoir 220. In some embodiments, a mixer or sparger (e.g., a static mixer, a sparging stone) can be included in an inline configuration and/or as part of the storage reservoir to ensure homogeneous distribution of ozone within water of the system and thus, efficient sanitation of produced water.

In various embodiments, system 200 can include pH measurement sensor(s), alone or in combination with other measurement device(s). System 200 (e.g., via controller 260) can be configured to adjust or maintain a target or predetermined pH parameter for water, for example based on sensed pH measurement(s) in the storage reservoir 220, in a recirculation flow path 221 and/or at a location downstream, for example at conduit 214. As an example, a predetermined pH water quality parameter can be between about 5.5 to 9, or preferably from about 7 to 8.5.

In another example, system 200 can include ionic conductivity or conductance measurement sensor(s). Water conductivity can be a measure of water quality, for example total dissolved solids (TDS) can indicate water purity with respect to additives, minerals, salts, ions, and the like. For example, water produced by water production system 202 can have a conductivity of about 2-10 μSiemens. System 200 can be configured to adjust produced water, via reservoir mineral packet 222 and/or customization unit 240, to a conductivity of greater than 300 μSiemens or approximately between about 300-600 μSiemens. As another example, system 200 can be configured to adjust produced water, via reservoir mineral packet 222 and/or customization unit 240, to a conductivity approximately between 390-500 μSiemens corresponding to approximately between about 250 ppm to 300 ppm TDS. In some embodiments, a controller (e.g. 260) can determine if a conductivity of the water in the storage reservoir (e.g., 220) is below a predetermined threshold; and, in response to determining the conductivity of the water is below the predetermined threshold, activate the water customization unit (e.g., 240) to provide one or more minerals into the water.

Figure 4:
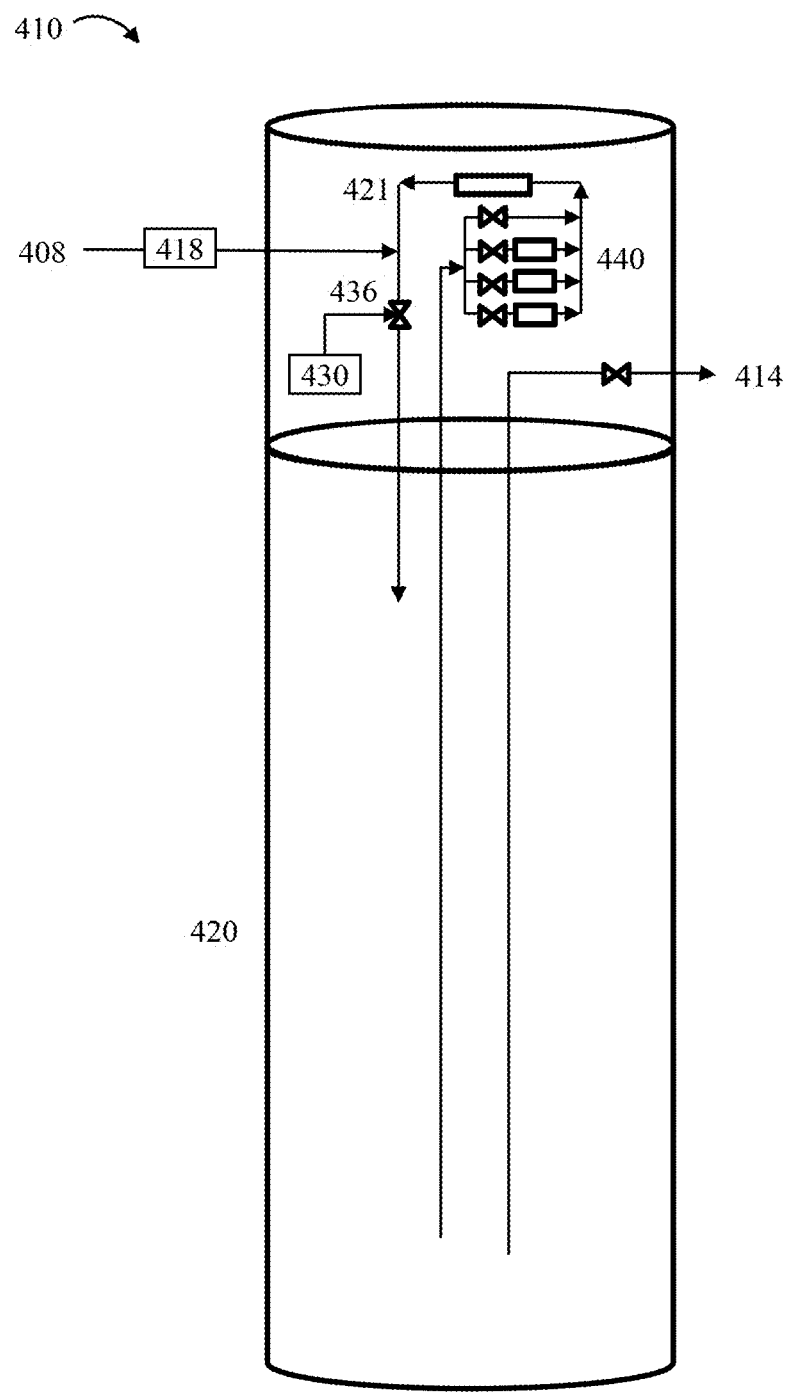
FIG. 4 depicts a water management system including a configuration for recirculating water quality adjustment, according to an exemplary embodiment.
Figure 5:
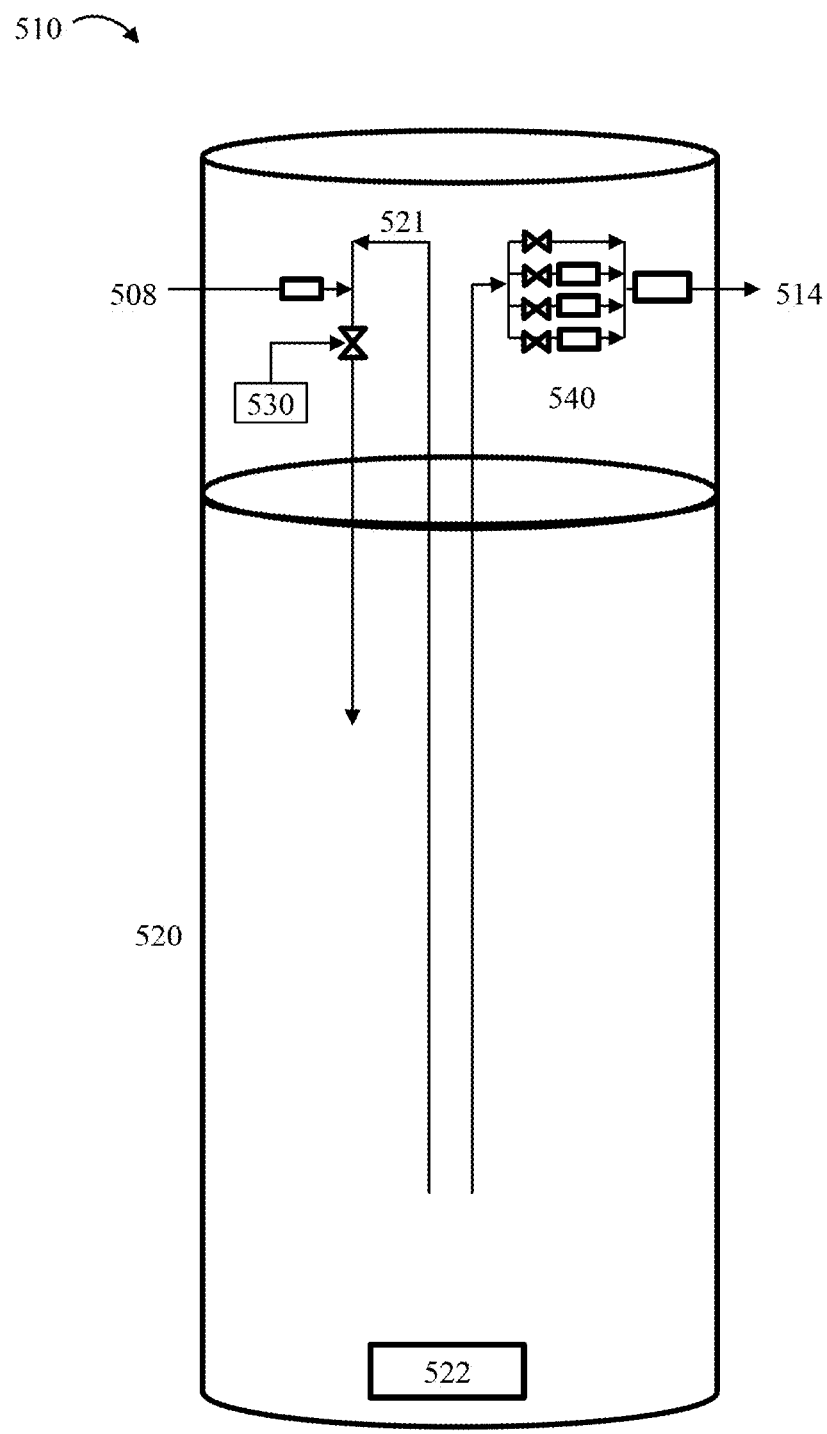
FIG. 5 depicts a water management system including a configuration for water quality adjustment on dispensing, according to an exemplary embodiment.

The example shown in FIG. 2 depicts a water management system configuration wherein water from storage reservoir 220 is split or directed between recirculation flow path 221 including sanitation unit 230 and flow path 241 including the customization unit 240 in advance of dispensing via outbound flow path 214, however other configurations are also possible without departing from the scope of this disclosure. As an illustrative example, FIG. 4 depicts a water management system 410 including a configuration for recirculating sanitation and water quality adjustment. In such implementations, an inbound additive cartridge 418 can modify inbound water, received via conduit 408, to a threshold pH and/or mineral content in advance of storage reservoir 420. Water in storage reservoir can be recirculated flow through sanitation unit 430 and additive adjustment unit 440 to maintain water quality and/or generate a water profile requested by a user. In one operational example of system 410, controller can operate sanitation unit 430 such that air can be injected at venturi 436 to reduce pH and addition of minerals at adjustment unit 440 can raise pH, such that water in storage reservoir 420 can be dynamically controlled in advance of dispensing to a user via 414. As another illustrative example, FIG. 5 depicts a water management system 510 including a configuration for water quality adjustment on dispensing and disinfection, via sanitation unit 530, upon recirculation through flow path. In such implementations, submerged additive packet 522 can set a threshold pH and/or mineral content in storage reservoir 520 and additive adjustment unit 540 generates a desired water profile during dispensing to a user via outlet 514.

Figure 6:
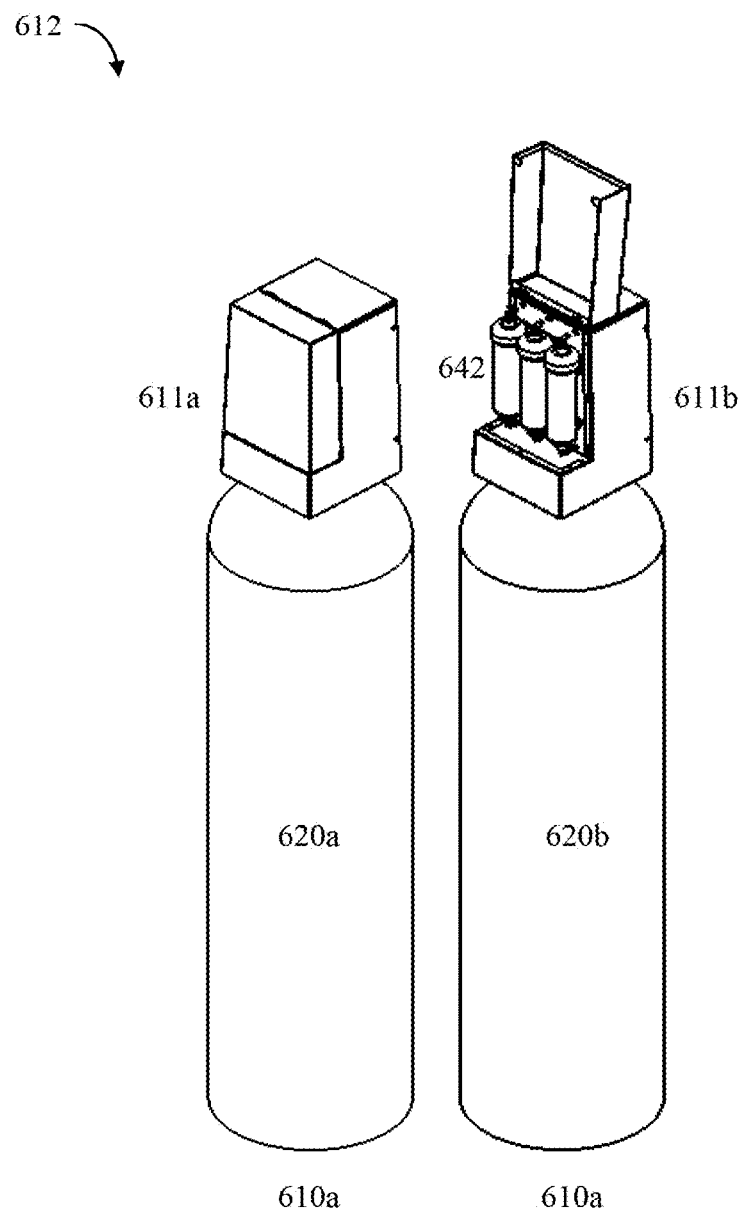
FIG. 6 depicts a serviceable water management system, according to an exemplary embodiment.

The water management system can include a housing or enclosure (e.g., 112) to protect internal components, enable facile maintenance and installation, dampen electrical emissions by acting as Faraday cage, dampen or reduce noise to below a predetermined noise threshold (e.g. approximately at or below about 40 decibels from an about 1 meter distance) and/or provide an aesthetically preferable form for a consumer. As a non-limiting example, FIG. 6 depicts a water management system 610 in an operational state 610a and a maintenance or serviceable state 610b. Housing 612 of water management system 610 includes a lower cylindrical storage reservoir 620 operatively coupled to an upper housing assembly 611 comprising a base assembly and a hinged swinging door configured to facilitate access to replaceable additive cartridges 642. Additive cartridges 624 can be replaced on a schedule, after a predetermined operational life or usage time (e.g., with replacement alerts sent to user via user interface), replacements due based on a user preference, elapsed time or usage and/or the like.

In some embodiments, the present systems for water production and management may be modular in nature. For example, the present systems may be configured such that each component may be separated from one another, transported, assembled and/or re-assembled with one another (e.g., in a same or a different configuration), and/or the like in a relatively simple manner (e.g., some embodiments of the present systems and components thereof are modular in nature). For example, in some embodiments, the sub-units of the water production system or water generating units, are configured such that no dimension of any singular component is larger than six to eight feet (e.g., to facilitate transport of the system or components thereof). As another example, a water management system can be configured such that each water management system has a footprint not to exceed about 1 meter be able to pass through standard or customary doorways to facilitate installation. Furthermore, storage reservoir can be configured to be configured to engage with the upper assembly 611 (including controller, water sanitation unit and water quality adjustment unit) upon installation at installation site so as to minimize transportation costs and/or provide optionality in water storage size. As such, the size of the storage reservoir can range depending on user preference (e.g., 50-600 L is storage size) with the upper assembly (e.g.

611) being operable across all storage options, for example upon installation an initializing a mode based on storage size.

However, many other configurations are also possible depending on installation site or other preferences.

In various embodiments, system processor or controller (e.g., 160, 260) can be integrated into, or in communication with, the water management system (e.g., 110, 210) to perform some or all of the functions associated with the water management system (e.g., 110, 210) described herein. Controller 160, in communication with sanitation unit 130, water customization unit 140 and the user water management system 179 through the user interface 180, can execute computer-executable program instructions to implement various methods of water metering, sanitation, treatment, storage, customization and dispensing. Generally, the water system (e.g. 100, 200) can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of systems described herein. In some embodiments, information or data communicated to a controller (e.g., 160, 260) by one or more peripheral devices may be stored in a data logging unit or database. In some embodiments, water levels or conditions can be measured in real-time or can be forecast based on, for example, historical averages and/or the like. In embodiments in which controller 160, 260 receives real-time measurements, various meters or sensors can provide data indicative of water conditions to a controller (e.g., continuously, periodically, when requested by controller, and/or the like) and in response, the controller may be configured to control pumping device(s) (e.g., 226, 247), sanitation unit(s) (e.g., 230), additive or mineralization unit(s) (e.g. 140, 240), and/or the like. Various examples of controller operation will be described in more detail below.

Controller (e.g., 160, 260) can be configured to determine an amount of water produced by the water production system, received by the storage reservoir from the water production system and/or a water level of the storage reservoir. Furthermore, the controller (e.g., 160) can be configured to communicate to the user, via the user interface (e.g., 180) various information regarding water quantities including but not limited to: an amount of water produced by the water production system, an amount of water present in the storage reservoir, an amount of water dispensed to the user, and/or the like.

Controller 190 may be configured to improve water disinfection and storage by controlling a pump rate and/or flow rate, controlling or activating a sanitation unit (e.g., ozone generator, UV lamp), controlling a valve (e.g., recirculation, additive or dispensing valve) and/or the like, based on inputs of one or more of measurements (e.g., such that controller may improve treatment of source water, maintain quality of stored water and dispensing of treated water).

In many embodiments, system 100, 200 can be configured to maintain the quality of water stored in reservoir 120, 220 for example by intermittently treating water stored in reservoir 120, 220 based on sensed conditions, programming and/or user selection. In one example, water storage reservoir 120, 220 includes a water level sensor 224 (e.g., ultrasonic, different pressure, laser, float, displacement, bubbler, load cell, capacitance, magnetostrictive, radar level sensors and/or the like) configured to measure the water level or amount of water in storage reservoir 120, 220. Controller 160, 260 can be configured to determine an operational setpoint of the water management system, or more particularly the sanitation unit based, at least in part, on the amount of water received by the storage reservoir from the water production system. For example, controller 160, 260 can be configured to activate a recirculation pumping device (e.g., 226) to flow water in recirculation flow path 221 at a flow rate based on the water level in storage reservoir 120, 220 so as to treat recirculating water (e.g., via sanitation unit 130) at a corresponding rate. In yet another example, controller 160, 260 can be configured to activate a pumping device (e.g., 226) to flow water from reservoir 120, 220 in recirculation flow path 221 and activate sanitation unit 130 if a predetermined time period has lapsed. For example, the predetermined time period can correspond to a predetermined time in a diurnal cycle (e.g., morning and evening or twice a day corresponding to a 12 hour time lapse). In some embodiments, the controller can be configured to sanitize water in reservoir 120, 220 via recirculation in response to external conditions (e.g., ambient temperature) or conditions related to peripheral components or units (e.g., rate of water generation from atmospheric water generator 204a-d). In one example, the controller can be configured to sanitize water in reservoir 120, 220 via recirculation during time periods of low or reduced source water generation from a solar thermal atmospheric water generator (e.g. early morning and late evening) or consumption by users.

In several embodiments, the controller (e.g., 160, 260) is configured to operate the system to provide sanitized water having a custom water profile to a user in response to one or more inputs by the user via the user interface (e.g., 180). The user interface (e.g., 180e) can communicate information to the user relating to water conditions, profiles or recipes. For example, user interface can display information relating to a predetermined set of water recipes (e.g., baseline, balanced, alkaline, electrolyte), information relating to water temperature, mineral content, pH, acidity, alkalinity, total hardness, conductivity, $CO_2$ concentration, microbe concentration or presence, oxidizing agent concentration or presence, total dissolved solids (TDS), turbidity and/or the like.

Furthermore, user interface (e.g., 180) can present an option to a user for selection between multiple water profiles or recipes. Controller (e.g., 160, 260) can receive, via the user interface, a first input from the user indicating a request for water having a first water profile. The controller (e.g., 160, 260) can determine an operational setpoint of the water customization unit (e.g., 140, 240) based, at least in part, on the first input from the user. In one example, controller 260 can determine an operational setpoint of the water customization unit 240 by determining a proportioning setpoint of the one or more proportional valves 243 based, at least in part, on the first input. Additionally, the user water management system 179, via the user interface (e.g., 180) can transmit to the controller (e.g., 160), a second input from the user indicating a request for water having a different water profile or recipe. The controller can receive the updated user input indicating a request for a different water profile and adjust the operational setpoint of the water customization unit based, at least in part, on the updated user input so as to generate water having the updated water profile for dispensing to the user via the dispenser.

In some embodiments, controller can be configured to receive information relating to one or more water conditions including water quality parameters, water flow rates, water production rates, water levels and/or the like. The controller can be further configured to monitor the received information relating to the one or more water conditions; and in response, determine an operational setpoint of the water management system, or more particularly the water customization unit and/or water sanitation unit based, at least in part, on the first input and the received information relating to the one or more water conditions. Furthermore, the controller can be configured to receive one or more signals indicative of one or more water conditions sensed by one or more sensors associated with the system and/or external information, for example as received by the network.

As described above, the water production system can operate entirely by solar energy without external grid power. The water management system can be powered by grid power, the solar-powered water production system or a combination thereof. In an implementation where the water management system is at least partially powered by the water production system (e.g., directly or via an onboard water management system battery charged by the water production unit), the controller (e.g., 160, 260), in communication with the water production system, can receive a system power state (e.g., solar energy being received by water generating units, power availability of a battery onboard a water generating unit). The controller (e.g., 160, 260) can then determine a power operational setpoint of the water management system based on the water production system power state.

The controller (e.g., 160, 260) can be further configured to determine an operational setpoint of the water management system (or more particularly, the sanitation unit and/or customization unit) based, at least in part, on the water production system power state. In one example, the controller (e.g., 160, 260) is further configured to determine a battery charge rate, a discharge rate and/or state of charge (SOC) limit, based, at least in part, on the water production system power state. In another example, the system (e.g., 200) can comprise one or more production pumps for pumping water generated by water generation units (e.g., 204a-d) to the storage reservoir (e.g., 220); and, the controller (e.g., 160, 260) can activate the one or more production pumps in a synchronized manner such that electrical power consumed by the water management system is minimized, for example when solar power is available or when a battery associated with the water production unit is above a predetermined SOC threshold. In another example, water generation units (e.g., 204a-d) can pump in water in a synchronized manner such that pumping to the water sanitation unit occurs at a predetermined time of day (e.g., end of day after water production ceases) so as activate the sanitation unit during that time, thereby minimizing power input to sanitation unit. In various examples, produced water can be stored in each water generation unit (e.g., 204a-d) until a predetermined threshold of water produced is reached, then a controller can activate one or more pumps to send water to a storage reservoir (e.g., 220). In such implementations, a controller (e.g., 260) can activate the one or more production pumps, for example in a round robin or cyclical manner, based on an actual or estimated water production, a time of day, a pre-determined schedule, a periodic schedule and/or the like to direct produced water to a storage reservoir (e.g., 220).

As additional non-limiting examples, a controller (e.g., 160, 260) can determine if a water level of the storage reservoir is above threshold, and in response, decrease power to a water generating unit of water production system (e.g., water production or unloading units power draw or operate in a low water production mode) so as to divert available energy to charge a system battery, either associated with the water production system, water management system or a combination thereof. As another example, a controller (e.g., 160, 260) can delay transfer or produced water to storage reservoir (e.g., via conduit 108) so as to increase available power to one or more actively powered water generation units for water production (e.g., water uptake fans, condenser cooling fan speeds and/or the like), thereby diverting more PV power to the production of water.

In another operational example, the controller (e.g., 160, 260) can determine an operational setpoint of the sanitation unit (e.g., 130, 230) by determining an ozone generation schedule based on at least one of: diurnal temperature variation, diurnal relative humidity or dew point variation, diurnal solar insolation variation, a weather forecast (e.g. cloud cover, temperature, heat), a water production rate of the water production system, or a combination thereof. In addition, social interactions with household members and/or guests. According to the determined ozone generation schedule, the controller (e.g., 160, 260) can generate ozone, via an ozone generator (e.g., 232) of the sanitation unit (e.g., 230) and apply the generated ozone to water of the water storage reservoir (e.g., 220) according to the ozone generation schedule.

In an embodiment, a controller (e.g., 160, 260) can operate a water system (e.g., 100, 200) in a plurality of modes. For example, a controller (e.g., 160, 260, a controller associated with the water production system, or a central controller) can operate the system in a quiet mode wherein the controller receives, via the user interface, an input from the user indicating a request for a quiet time period. The controller can determine a quiet schedule to operate the sanitation unit and/or the water production system based, at least in part, on the user input. In another example, a controller (e.g., 160, 260, or a central controller) can operate the water management system in a power save mode wherein electrical power is not or minimally consumed by water sanitation unit (e.g., 130, 230) or water customization unit (e.g., 140, 240). As yet another example, a controller, based on a user input or command received via the network, can set the system in a hibernation mode wherein new water is not produced and/or water is not dispensed. Furthermore, a controller, based on a user input or command received via the network, can set the system in a maintenance mode wherein water is not dispensed to a user pending maintenance or part replacement (e.g. filters, additive cartridges or packets). In one example, the user water management system 179, through the user interface (e.g., 180) can notify the system user of system faults, errors and/or maintenance requirements (e.g., mechanical faults, communication faults, maintenance or service scheduling due) based on information received from the network (e.g., 182) and/or determined by system controller (e.g., 160).

FIG. 7A-13B depict a various screens or displays of a user interface (e.g., 180) on a user device according to certain embodiments of the present disclosure. In certain embodiments, the user device may be a mobile device such as a smartphone. A mobile device can further include a controller, memory, a wireless communication processor connected to an antenna and other associated components. However, the skilled artisan will appreciate that the features described herein may be adapted to be implemented on other devices (e.g., a laptop, a tablet, a server, an e-reader, a camera, a navigation device, etc.).

The user water management system 179 can be implemented via a mobile display and a touch panel. The display of the user water management system 179 may additionally display a graphical user interface (e.g., 180) for a user to control aspects of the system 100, 200 and other mobile device features. Further, the mobile device display may display characters and images received by the mobile device and/or stored in the memory or accessed from an external device on a network (e.g., 190). For example, the mobile device may access a network (e.g., 190) and display text and/or images transmitted from a network server. The mobile device touch panel may include a physical touch panel display screen and a touch panel driver. The touch panel may include one or more touch sensors for detecting a user input operation on an operation surface of the touch panel display screen. Used herein, the phrase "touch operation" refers to an input operation performed by touching an operation surface of the touch panel display with an instruction object, such as a finger, thumb, or stylus-type instrument. In certain aspects of the present disclosure, the touch panel may be disposed adjacent to the display (e.g., laminated) or may be formed integrally with the display. For simplicity, the present disclosure assumes the touch panel is formed integrally with the display and therefore, examples discussed herein may describe touch operations being performed on the surface of the display rather than the touch panel. However, the skilled artisan will appreciate that this is not limiting.

The mobile device antenna may transmit/receive electromagnetic wave signals to/from other external apparatuses or systems (e.g., water production system, water management system), and the short-distance wireless communication processor may control the wireless communication performed between the other external apparatuses. Bluetooth, IEEE technical standards (e.g., IEEE 802 standards like IEEE 802.11, IEEE 802.15, and/or the like), and near-field communication (NFC) are non-limiting examples of wireless communication protocols that may be used for inter-device communication via the short-distance wireless communication processor.

Figure 7A:
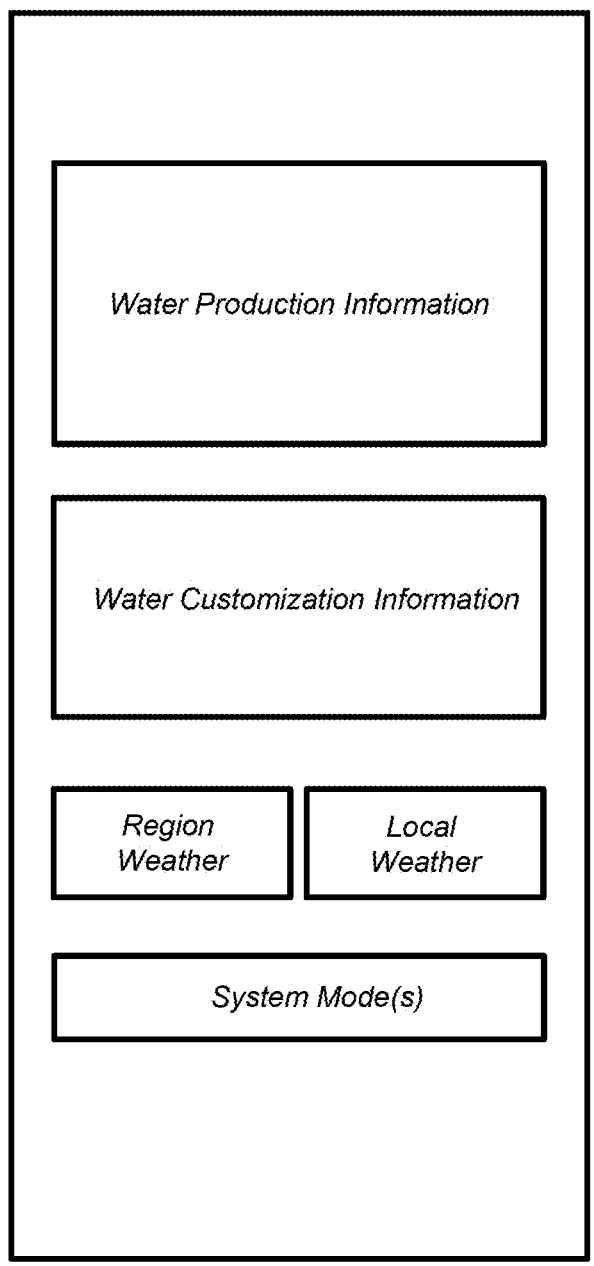
FIG. 7A depicts a user interface for displaying current operational information, according to various exemplary embodiments.
Figure 7B:
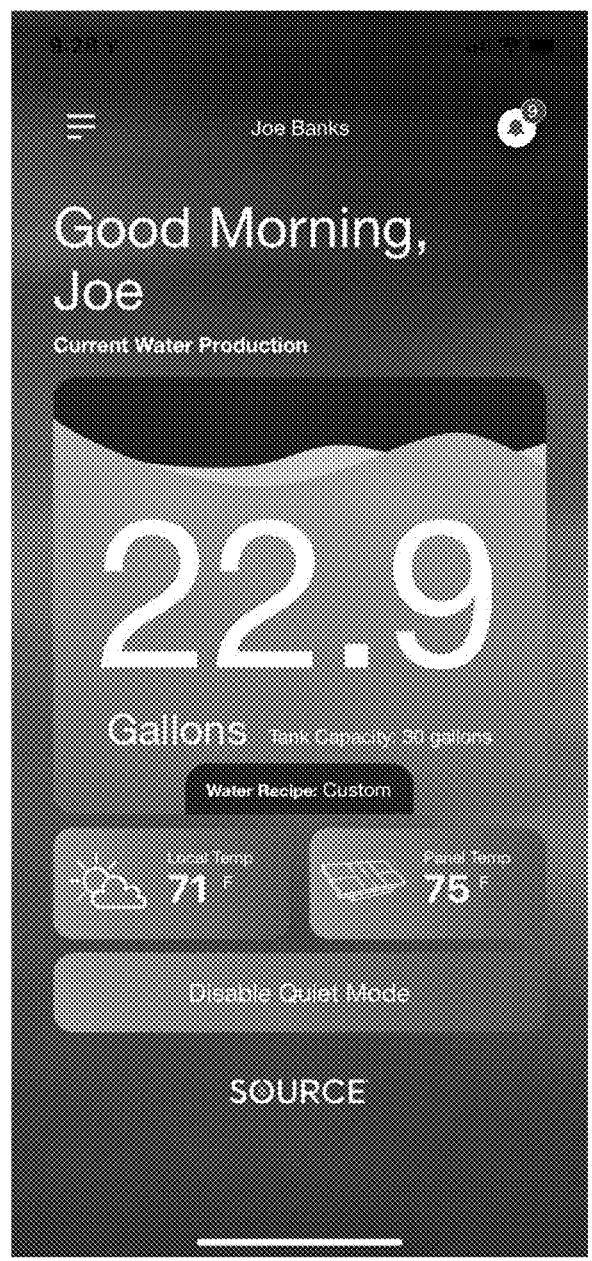
FIG. 7B depicts a user interface for displaying current operational information, according to an exemplary embodiment.

FIG. 7A and FIG. 7B show examples of user interface 180. FIG. 7A shows a simplified block diagram embodiment and FIG. 7B is an illustrative embodiment of user interface 180, however the embodiments suggested in FIG. 7A and FIG. 7B can be exemplified in many other ways. The user interface screen 180*a* can be used by a consumer as a home screen or dashboard for displaying information regarding current water production (e.g. storage reservoir or tank level), weather information (e.g., local weather information received via network 182, weather information like temperature, relative humidity, solar insolation measured at water production system, or a combination thereof), operational status of water production system 102 (e.g., solar performance or efficiency, power state), water management system 110 (e.g. current water recipe setpoint), and/or system alerts or messages (e.g., maintenance requirements and/or the like). Furthermore, consumer can set or input, via a touch operation, different operational modes of system 100, for example, to disable or enable a "Quiet Mode" for water production system 102 and/or water management system 110, change water profile or recipe and so on.

Figure 8A:
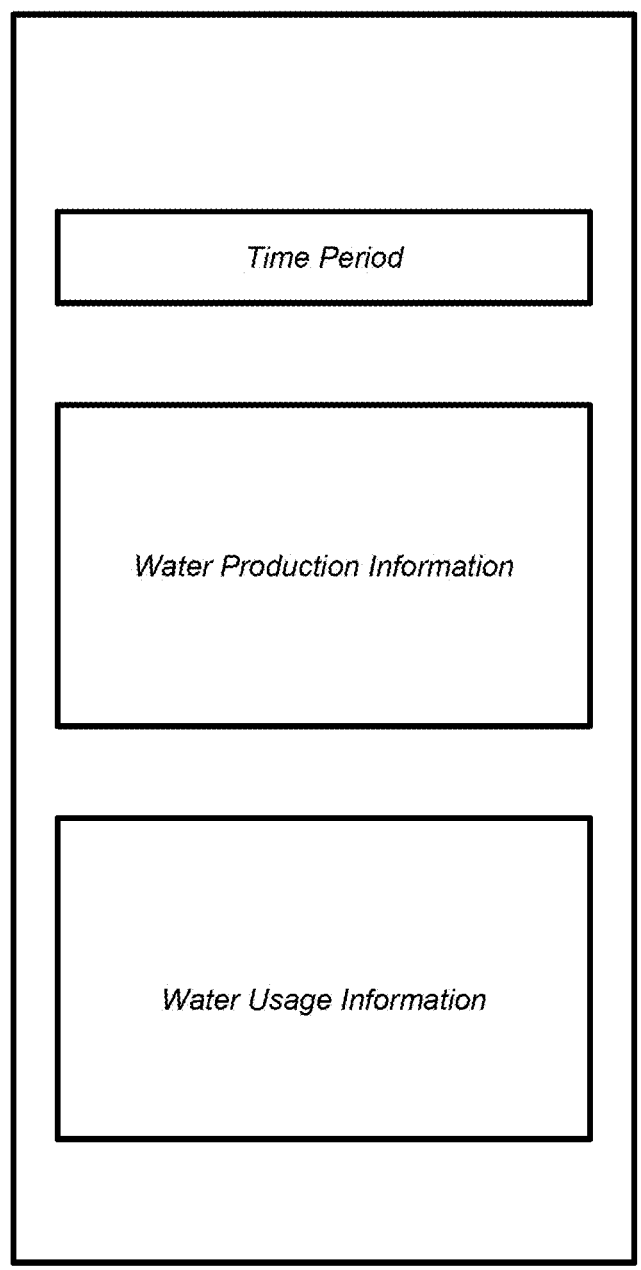
FIG. 8A depicts a user interface for displaying historical operational information, according to various exemplary embodiments.
Figure 8B:
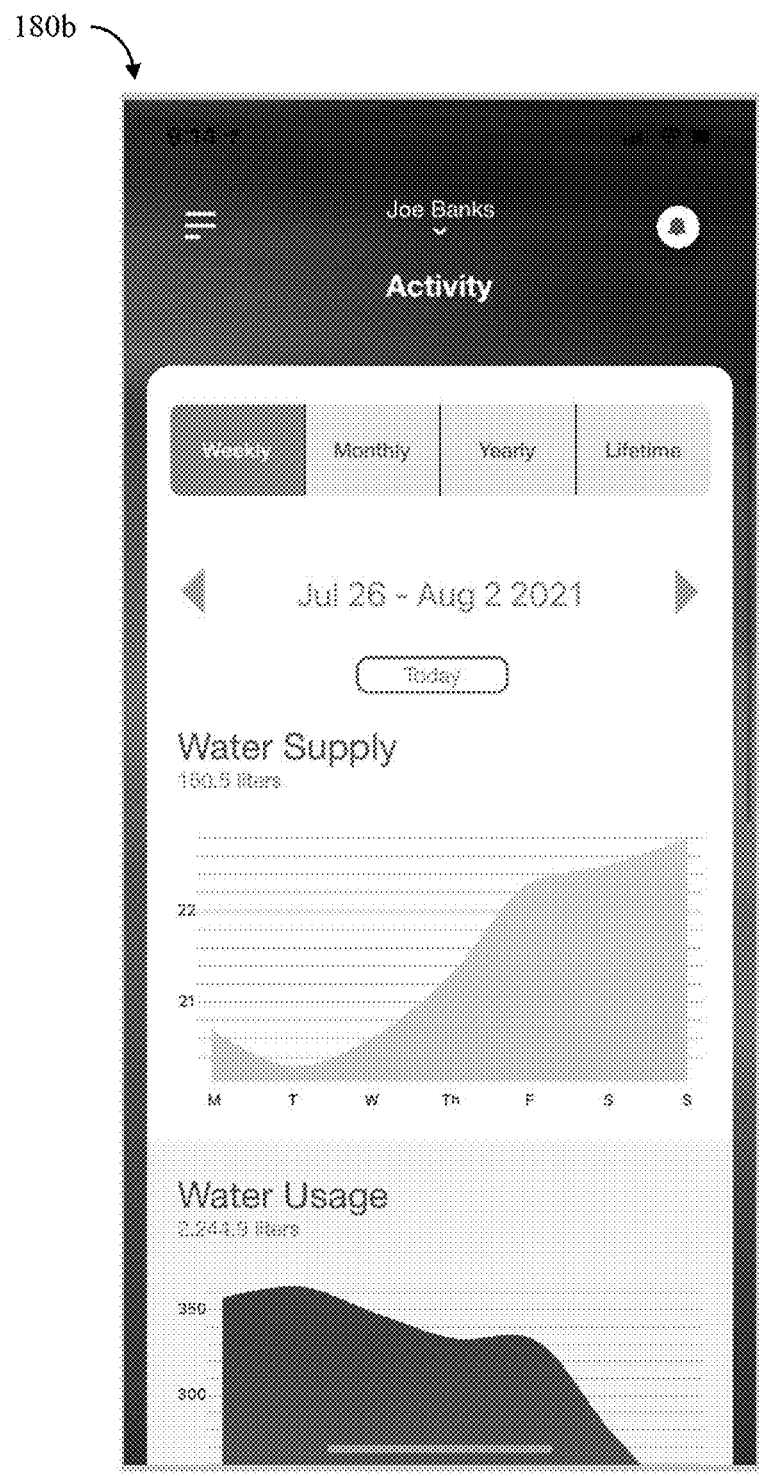
FIG. 8B depicts a user interface for displaying historical operational information, according to an exemplary embodiment.

Another example of user interface 180 is shown in FIG. 8A and FIG. 8B. FIG. 8A shows a simplified block diagram embodiment and FIG. 8B shows an illustrative embodiment of user interface 180, however the embodiments suggested in FIG. 8A and FIG. 8B can be exemplified in many other ways. The user interface screen 180*b* can be used by a user or consumer to review water production and usage activity and/or other historical information relating to operation of the drinking water system over a desired time period. Furthermore, user can toggle, for example via a touch operation, between different activity information of system 100, for example, review total water production over a week, month, year or lifetime, review total water usage over a week, month, year or lifetime, and so on.

Figure 9A:
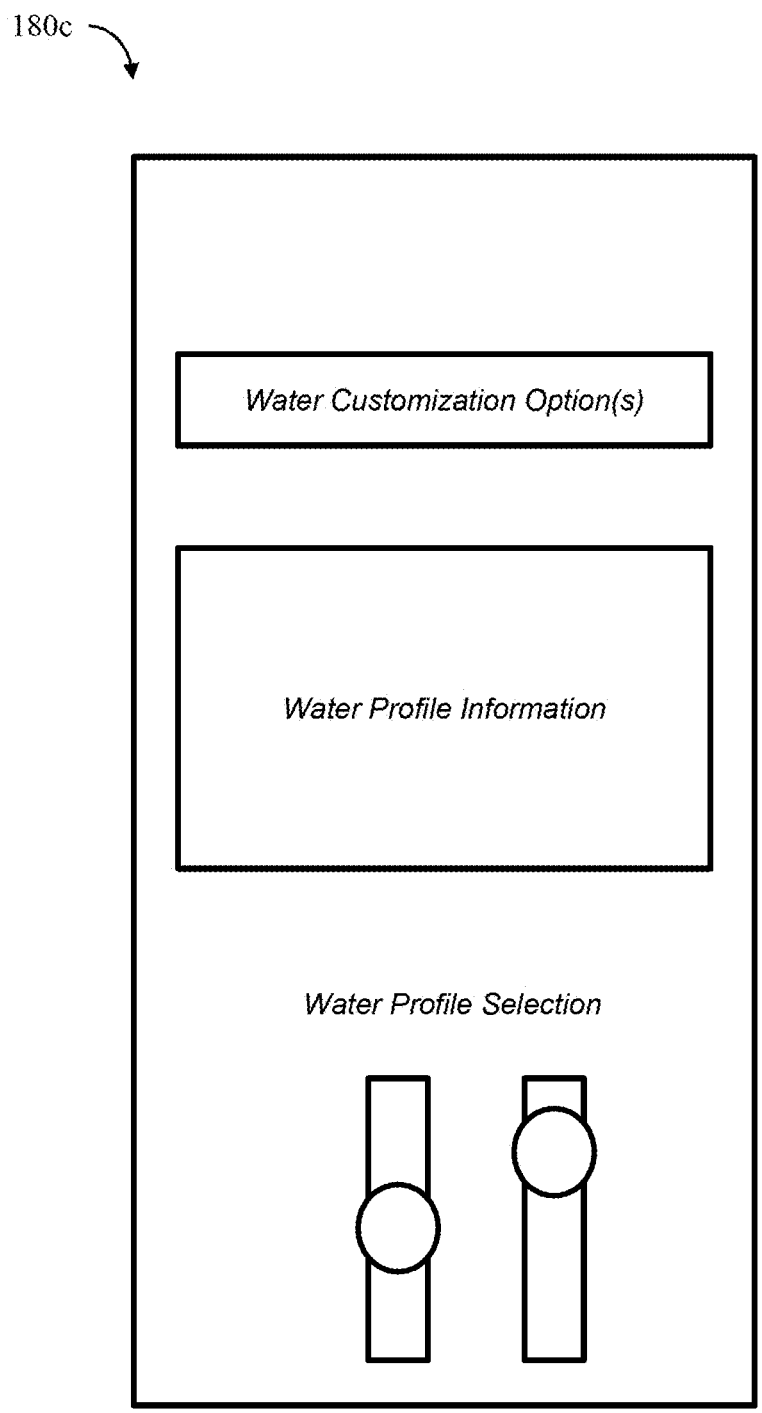
FIG. 9A depicts a user interface for adjusting a water profile, according to various exemplary embodiments.
Figure 9B:
FIG. 9B depicts a user interface for adjusting a water profile, according to an exemplary embodiment.

Referring now to FIG. 9A and FIG. 9B, the user interface screen 180*c* can be used, for instance, by a user to select or adjust, for example via a touch operation, any number of different water profiles, recipes, custom setpoints and formulations. FIG. 9A shows a simplified block diagram embodiment and FIG. 9B shows an illustrative embodiment of user interface 180, however the embodiments suggested in FIG. 9A and FIG. 9B can be exemplified in many other ways. In use, the graphical user interface 180*c* can provide a consumer with selectable, customizable and/or adjustable water profile options. The consumer can peruse, locate, select and/or adjust a desired water profile, recipe, and/or formulation and once a particular water option is selected or a water adjustment is input, the consumer can cause water having a corresponding Water profile to be generated or formulated, via water customization unit (e.g., 130), for dispensing by the dispenser (e.g., 170).

Various user control or input display elements or icons can be employed. For example, a water profile selection can be displayed with such features as, for example, a slider, a pop-up menu, a text entry field, and/or the like. Furthermore, a user can toggle, for example via a touch operation, between different water profile setpoints, information and so on. In the non-limiting example of FIG. 9A-10B, user interface screens 180*c-e* display a set of water recipes (e.g., "High Alkaline" and "Balanced" as non-limiting illustrative examples) for selection in addition to associated slider bar icons to show an associated pH and a mineral content (e.g., Ca, Mg) of the water, however other features, icons, and type of displayed information are also possible.

Figure 10A:
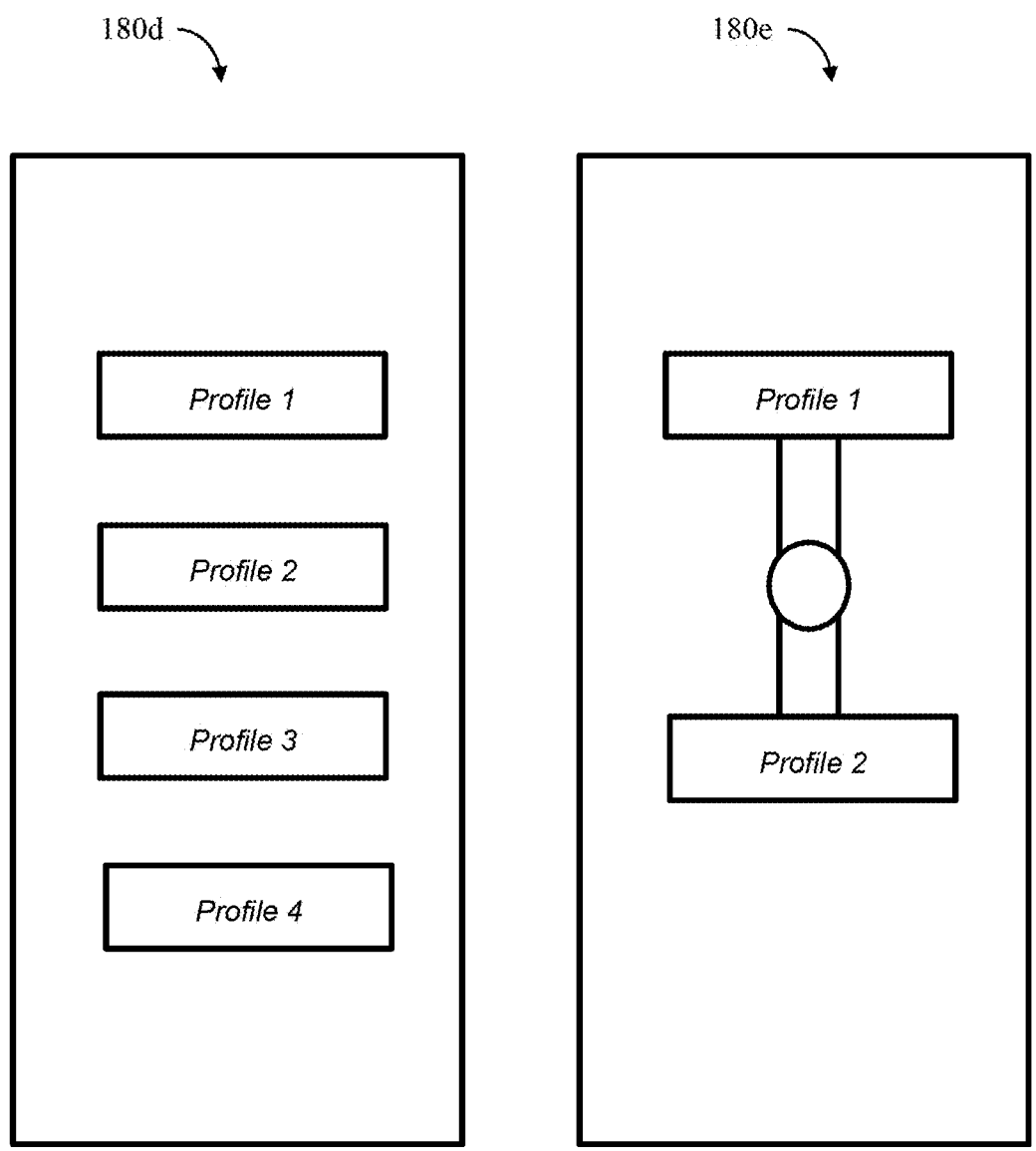
FIG. 10A depicts a user interface for adjusting a water profile, according to various exemplary embodiments.
Figure 10B:
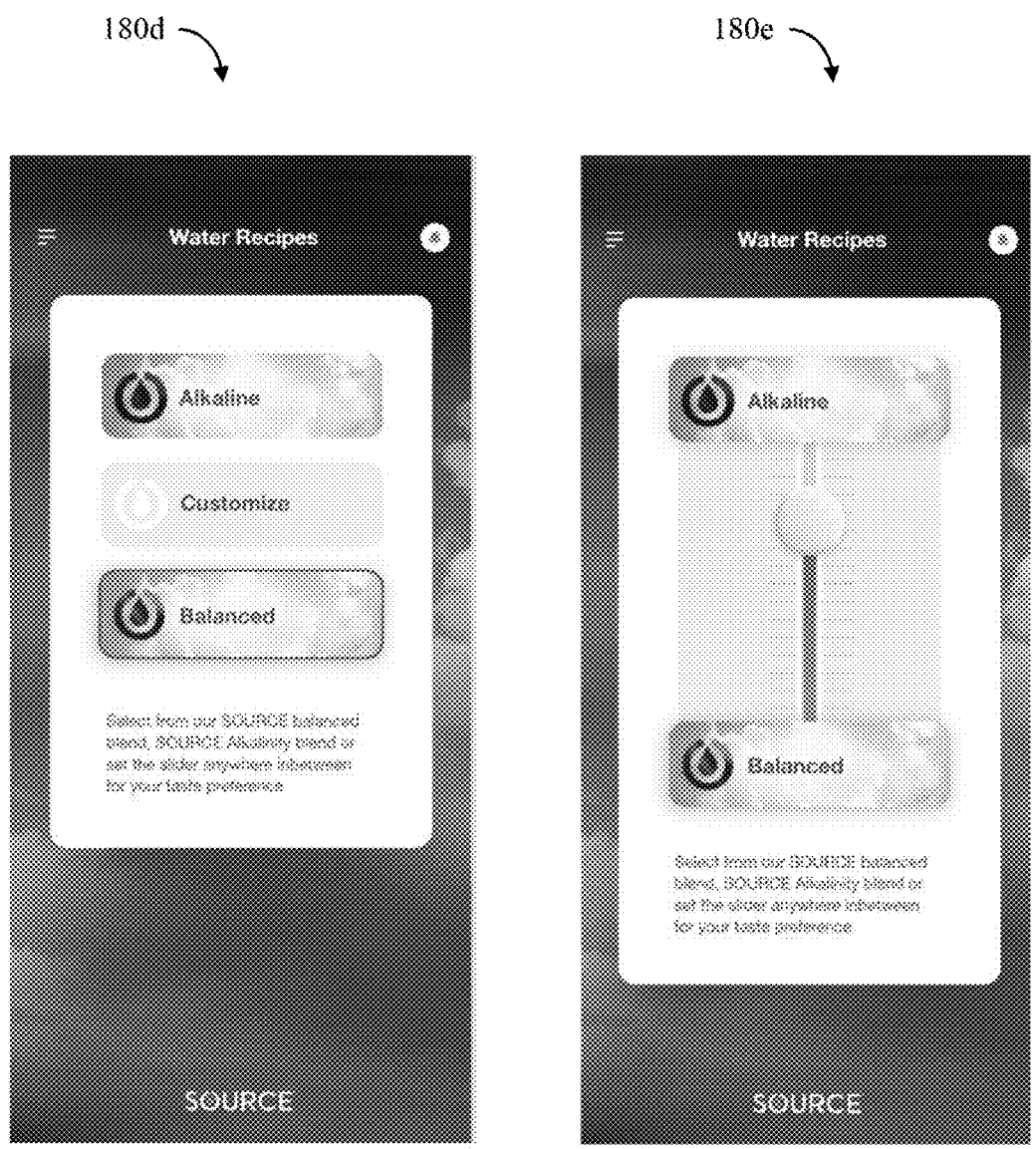
FIG. 10B depicts a user interface for adjusting a water profile, according to an exemplary embodiment.

In the non-limiting examples of FIG. 10A and FIG. 10B, user interface screen 180*d* can be used, for instance by a user to select, for example via a touch operation, between a set of water profiles or recipes (e.g., "Alkaline," "Balanced" or "Customized"). FIG. 10A shows a simplified block diagram embodiment and FIG. 10B shows an illustrative embodiment of user interface 180, however the embodiments suggested in FIG. 10A and FIG. 10B can be exemplified in many other ways. Upon selecting, for example by the touch operation, the "Customized" option, user interface 180*e* can provide the user with an expanded adjustable water profile slider bar enabling the user to adjust the water profile between two predetermined water profiles as desired, i.e. between "Alkaline" and "Balanced" in the examples of FIG. 10A and FIG. 10B. For simplicity, the non-limiting examples of FIG. 10A and FIG. 10B shows a water profile slider option between two predetermined water profiles. However, the skilled artisan will appreciate that any number of predetermined water profiles can be employed, with any number or type of adjustable or customizable options therebetween.

Figure 11A:
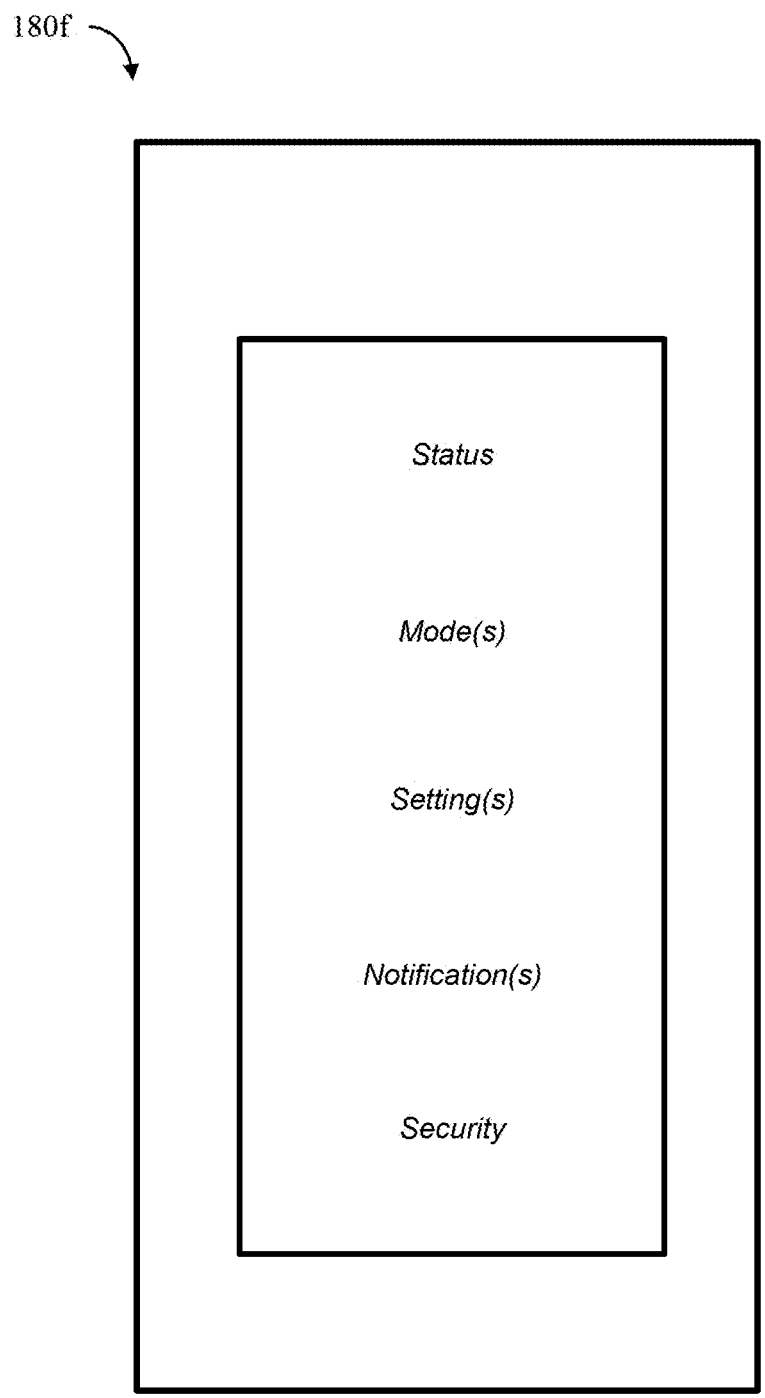
FIG. 11A depicts a user interface for displaying a selectable menu of features, according to various exemplary embodiments.
Figure 11B:
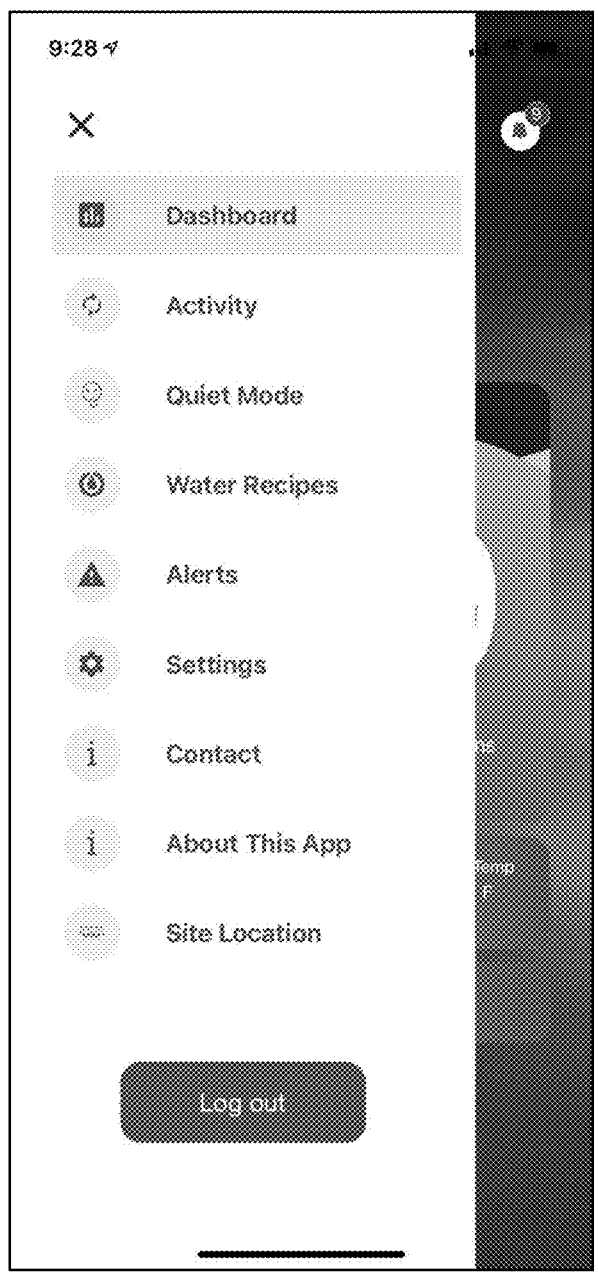
FIG. 11B depicts a user interface for displaying a selectable menu of features, according to an exemplary embodiment.

FIG. 11A shows a simplified block diagram embodiment and FIG. 11B shows an illustrative embodiment of user interface 180, however the embodiments suggested in FIG. 11A and FIG. 11B can be exemplified in many other ways. A user interface screen, such as 180*f*, can be used by a consumer to switch between multiple screens of a user application and/or manage administrative system functions or settings. As depicted in FIG. 11A and FIG. 11B, a pop-out menu can display various selectable screens or functions (e.g. display dashboard like 180*a*, display operational functions or selections like Quiet Mode, display or select set of water recipes like 180*c-e*, display system alerts, display installation site locations and/or other informational or administrative functions) for selection by a user.

Figure 12A:
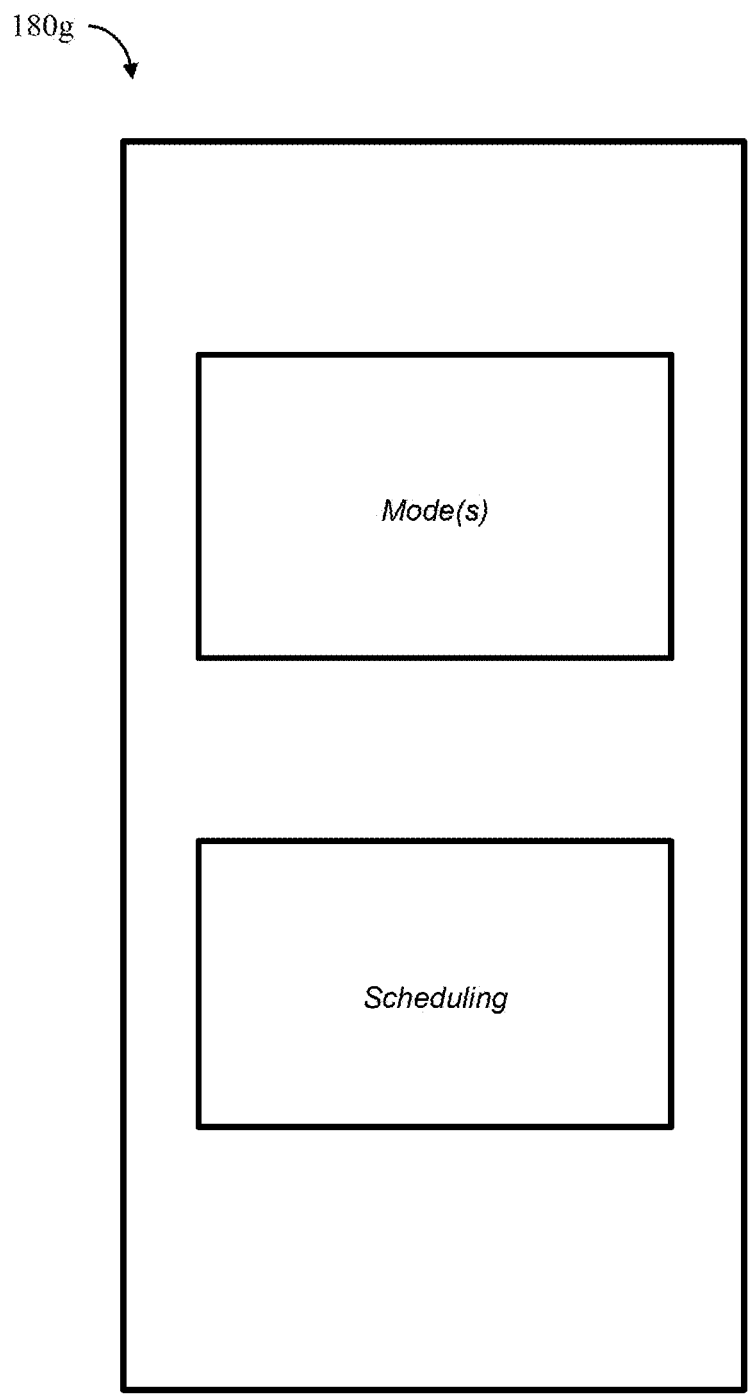
FIG. 12A depicts a user interface for displaying and receiving a user input relating to a system operational mode, according to various exemplary embodiments.
Figure 12B:
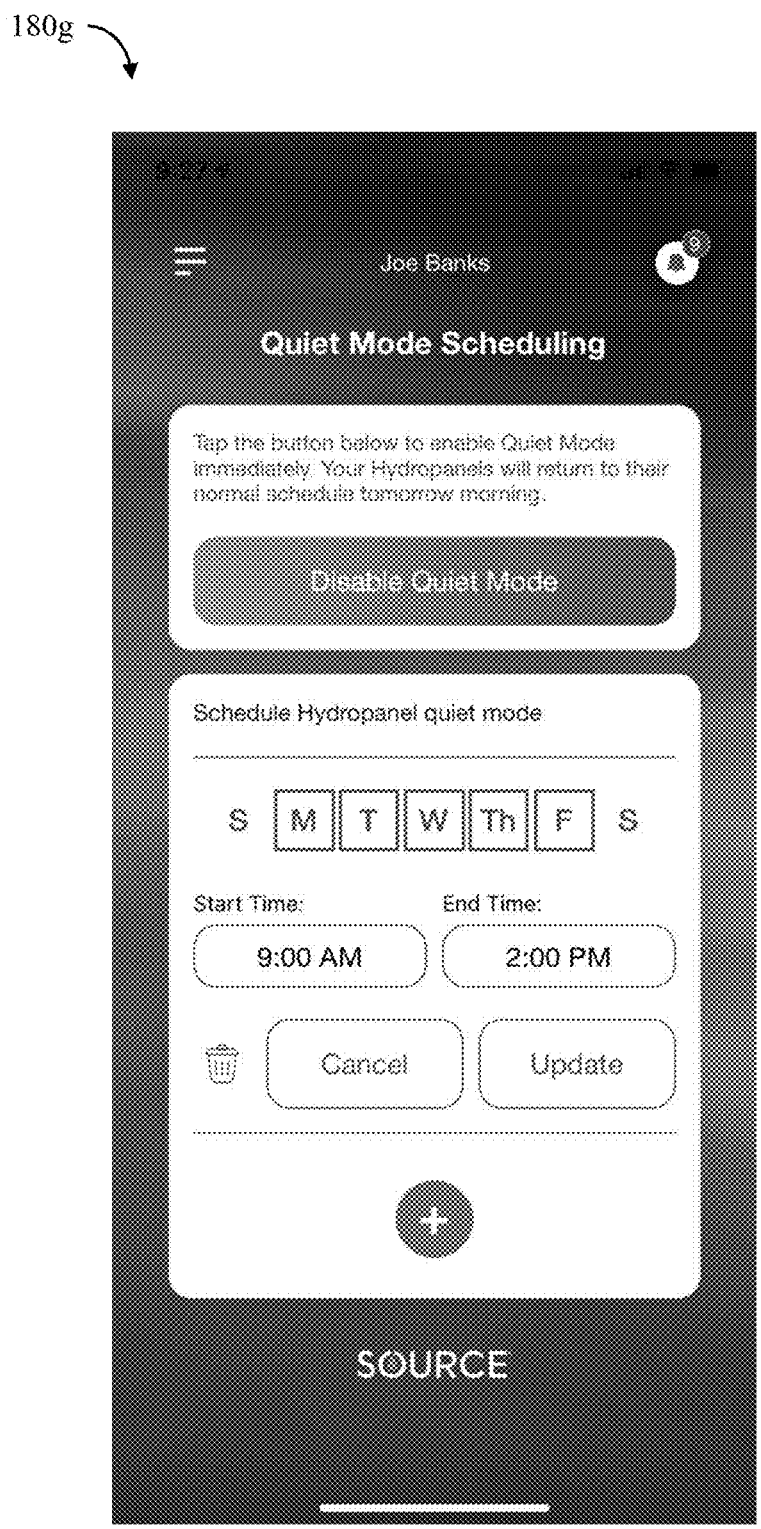
FIG. 12B depicts a user interface for displaying and receiving a user input relating to a system operational mode, according to an exemplary embodiment.
Figure 13A:
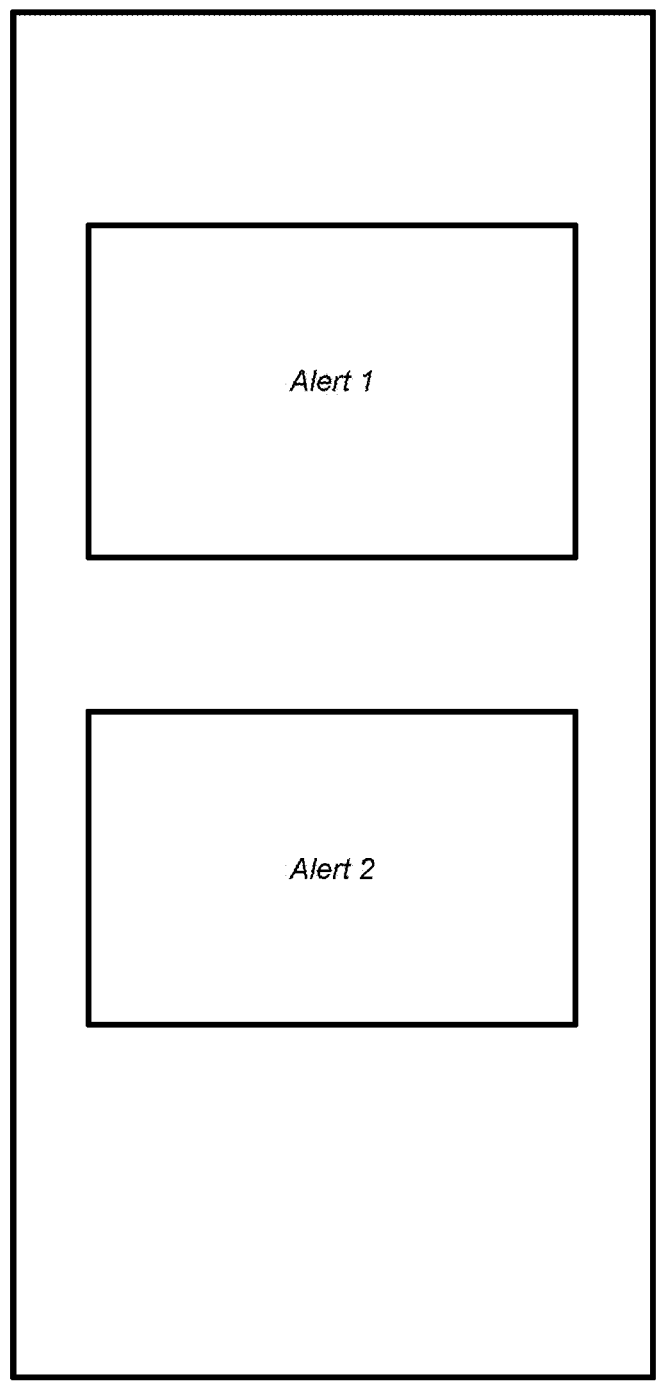
FIG. 13A depicts a user interface for displaying system alerts, according to various exemplary embodiments.
Figure 13B:
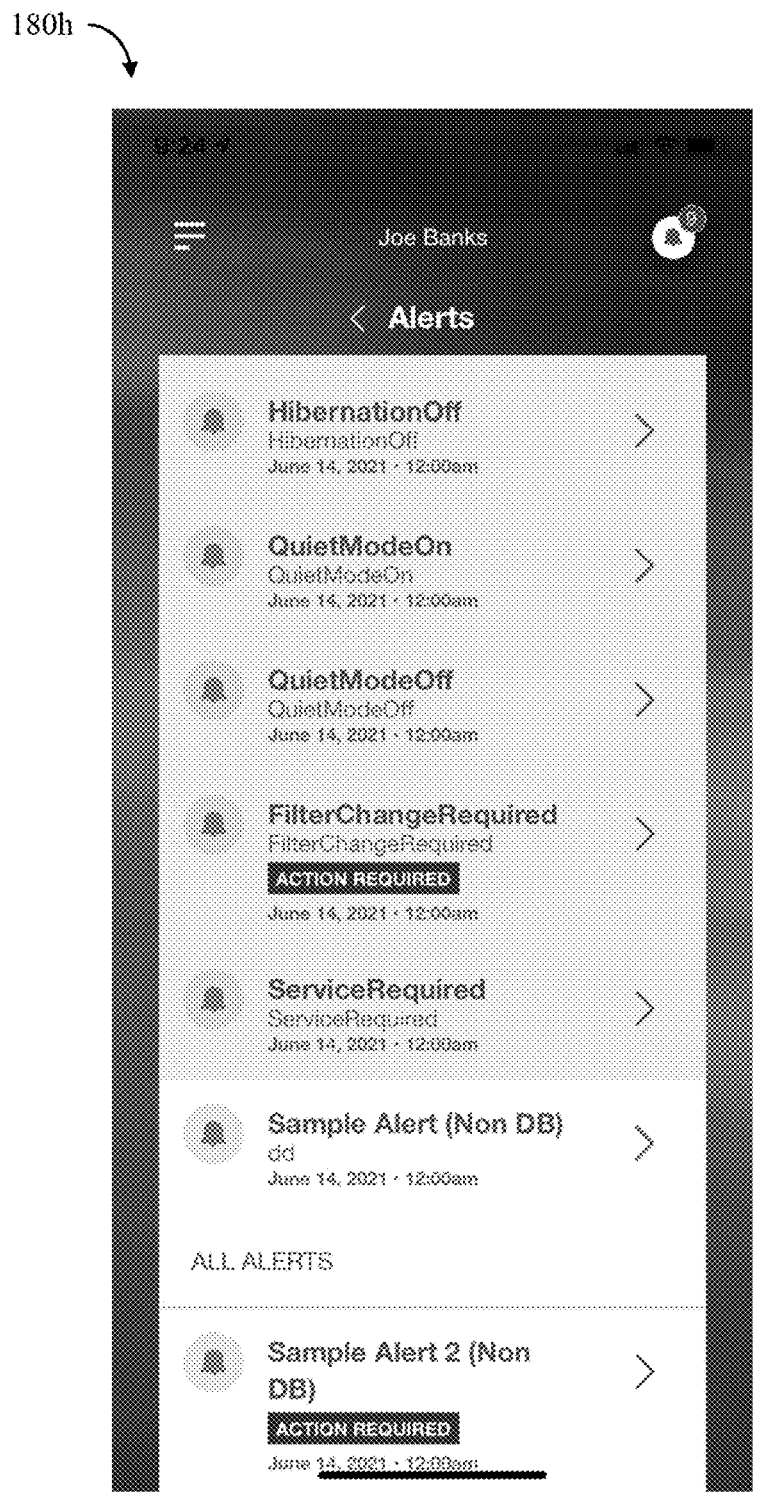
FIG. 13B depicts a user interface for displaying system alerts, according to an exemplary embodiment.

FIG. 12A shows a simplified block diagram embodiment and FIG. 12B shows an illustrative embodiment of user interface 180, however the embodiments suggested in FIG. 8A and FIG. 8B can be exemplified in many other ways. As depicted in FIG. 12A and FIG. 12B, user interface screen 180g that can be used, for instance, to display and receive user inputs relating to a system operational mode, for example to enable, disable or schedule a system Quiet Mode. As additional examples shown in FIG. 13A and FIG. 13B, user interface screen 180h can be used, for instance, to display system alerts or messages to a user (e.g., scheduled and/or non-scheduled maintenance alerts, information relating to system operational status, elapsed time after a predetermined operational life or usage time, component replacements due, and/or the like). FIG. 13A shows a simplified block diagram embodiment and FIG. 13B shows an illustrative embodiment of user interface 180, however the embodiments suggested in FIG. 13A and FIG. 13B can be exemplified in many other ways.

Figure 14:
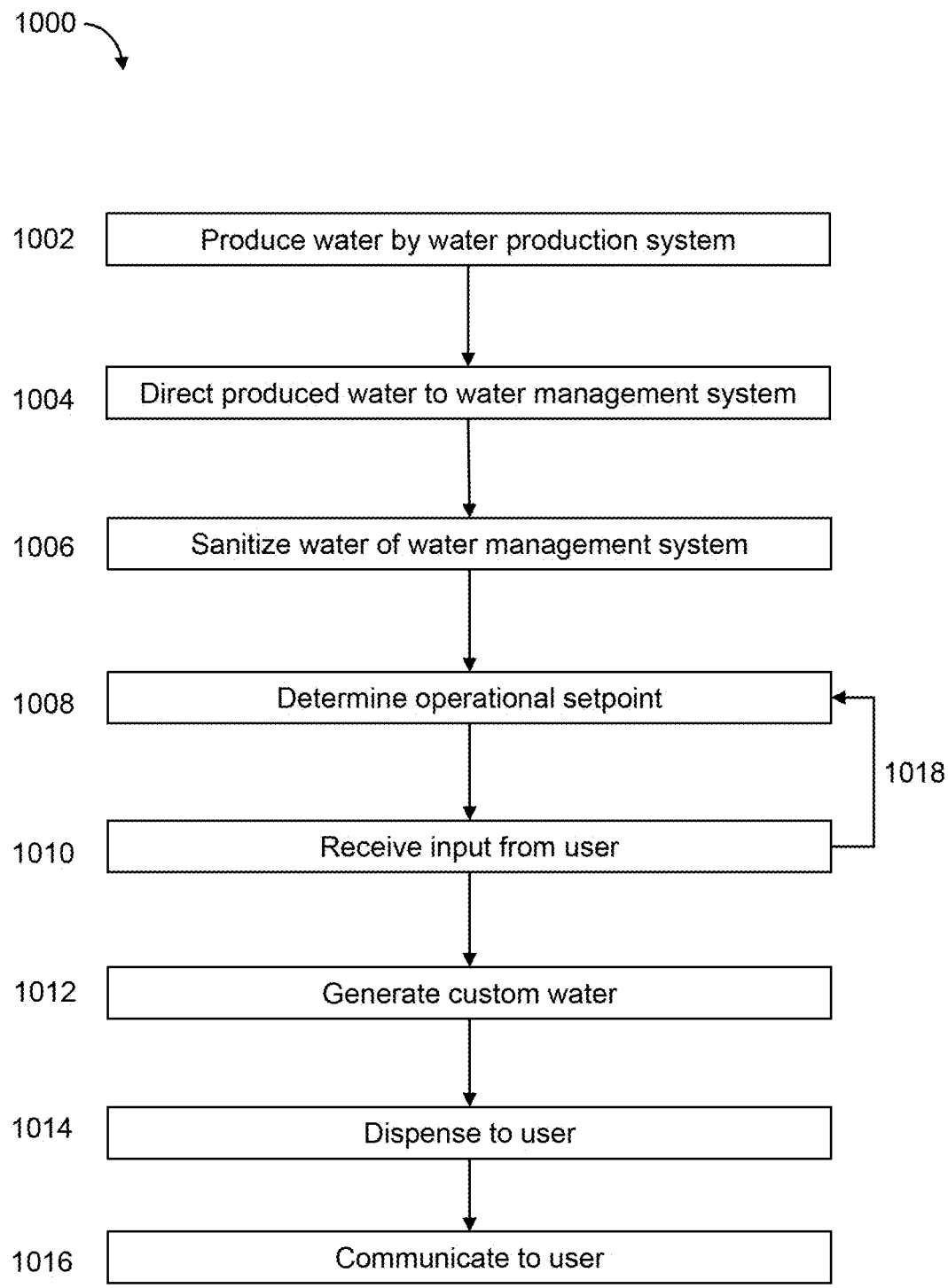
FIG. 14 depicts a flowchart for a method of operating a system for water production, treatment, storage and customization, according to various exemplary embodiments.

The present disclosure further provides methods or processes for providing drinking water (e.g. customized water) to a user according to one or more aspects of the exemplary disclosures. FIG. 14 is a flow chart 1000 depicting a non-limiting example of a method of operating a system for providing personalized or customized drinking water as described herein.

At operation 1002, the method of operating a system (e.g., 100, 200) for providing customized water to a user comprises producing water by a water production system (e.g., 102, 202) at operation 1002. In one particular example, water can be produced via one or more atmospheric water generators (e.g., solar thermal water-from-air panels 204a-d). One or more controllers, for example associated with each water generating unit, can dynamically and efficiently produce liquid water based on ambient environmental conditions (e.g. solar insolation, solar irradiance, temperature, RH) in combination with system operational properties or status (e.g. water content in water generating unit or water management system, battery state of charge (SOC), and so on). For example, the operational ranges and/or setpoints of the water production system can be determined and dynamically adjusted (e.g. according to the diurnal cycle) so as to efficiently drive water vapor from a hygroscopic material towards vapor pressure saturation in the working fluid and condensation at a condenser.

At operation 1004, the method of operating the system (e.g., 100, 200) comprises directing water produced by the water production system (e.g., 102, 202) to the water management system (e.g., 110, 210) including a storage reservoir, a sanitation unit and an additive or customization unit. One or more pumps associated with the water production system and/or the water management system can be actuated to pump produced water to the water management system, for example on-demand or programmatically, for example when power is available (e.g., solar energy is available, grid power is available). In some embodiments, operation 1004 can further comprise determining an amount of water produced by the water production system and/or received by the water management system from the water production system, for example by a controller in communication with the water management system and/or the water production system.

At operation 1006, the method further comprises sanitizing water received by the water management system from the water production system via sanitation unit of the water management system. For example, the operation of disinfecting or sanitizing water by sanitation unit can be based, at least in part, on the amount of water received by the storage reservoir from the water production system. As another example, the operational setpoint of the water sanitation device can be based on an environmental condition, a water production system operational state, a power availability and so on.

At operation 1008, the method further comprises determining, by a controller, an operational setpoint of the water management system. In one implementation, operation 1008 can comprise determining a power management setpoint for the water management system based on the received environmental condition and water production system operational state. Additionally or alternatively, operation 1008 can comprise determining an operational setpoint based on at least one of: an ambient solar irradiance, a forecast solar irradiance, a weather forecast, an ambient temperature, an ambient relative humidity, an amount of produced water, or a combination thereof. In some implementations, operation 1008 can comprise determining one or more operational setpoints of a water management system, based on one or more characteristics of a set of water profiles by an amount of water received by the water management system, an amount of water present in the water management system, a time lapse, a user input, a user request for water dispensing, a predetermined setpoint and/or by a machine learning model (e.g., a machine learning model developed by mapping the one or more operational variables to the one or more characteristics of the set of water profiles).

In one embodiment, operation 1008 can comprise determining one or more operational setpoints of the water management system based on a machine learning model. For example, the machine learning model can be trained with a training data set comprising the one or more operational variables of the water management system and one or more characteristics of the set of water profiles. Non-limiting examples of the training data set can include: an additive cartridge dwell time, an additive cartridge operational life, an additive cartridge operational usage, an additive cartridge soak volume, an additive absorption rate, an amount of water produced by the water production system, a water production rate of the water production system, an amount of water in the storage reservoir, a sanitation unit activation cycle, a sanitation unit activation time lapse, an amount of oxidizing compound generated by the sanitation unit, a water temperature, a water pH, a water mineral content, an ambient temperature, an ambient relative humidity, an atmospheric pressure, a solar insolation, a seasonal change or time and other desirable environmental conditions. The method can include determining the one or more operational setpoints of a water management system by randomly selecting a point in a space of the one or more operational variables, for example by a Monte-Carlo method. In one example, an additive or mineral use life scale model can be determined based on mineral absorption rate at various variable states (e.g. temperature increases absorption, so the model mineral age can be scaled based on the historical variable inputs wherein a high temperature month gets a 1.2 scaler on mineral life for that month, low temp month get 0.8 scaler, etc.)

In some embodiments, a method of training a machine learning model can comprise an operation of identifying model parameters of the training data set, for example, system operational variables and/or characteristics of a set of water profiles. Simulations of the model parameters (e.g., Monte-Carlo simulations) can be performed to build a training data simulation model. The method can further comprise an operation of generating simulated training data using the training data simulation model and also supplementing the training data with the simulated training data to create a supplemented training data set. The method can further comprise training the machine learning model using the supplemented training data set and storing the trained machine learning model for use in generating predictions relating to system operation and generation of water profiles.

At operation 1010, the method further comprises receiving, by the controller via the user interface, a first input from a user indicating a request for water having a particular water profile, for example a water profile comprising an associated pH and a mineral content. In an embodiment, a user can input a water profile, via a user interface, and a controller can determine or adjust an operational setpoint of the water management system (e.g. adjust a setpoint of a proportional valve). At operation 1010, the method can be repeated or cycled as indicated at 1018.

At operation 1012, the method further comprises generating a water profile for dispensing to the user. At operation 1012, controller can control adjustment or customization unit to add one or more additives into water from the storage reservoir upon flowing through the water customization unit. At operation 1014, the method further comprises dispensing water having the first water profile to the user via a dispenser.

At operation 1016, the method further comprises communicating to the user, via the user interface, at least one of: an amount of water produced by the water production system, an amount of water present in the storage reservoir, an amount of water dispensed to the user, information relating to one or more water profiles including the first water profile, or a combination thereof. Operation 1016 can further comprise the operation of presenting, by a user interface, a set of water profiles available to a user.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively. The term "about" or "substantially," as used herein, is intended to encompass minor deviations rather define an exact value.

The invention claimed is:

1. A system for providing customized drinking water to a user comprising:
   a water production system;
   a storage reservoir configured to receive water produced by the water production system;
   a sanitation unit configured to sanitize water in the storage reservoir;
   a water customization unit for adding one or more additives into water of the storage reservoir;
   a processor in communication with the sanitation unit, the water customization unit configured to add one or more additives into water at one or more locations selected from: upstream of the storage reservoir, within the storage reservoir, or downstream of the storage reservoir;
   a user water management system comprising a user interface configured to allow a user to monitor and adjust water usage, customization unit settings, and sanitation unit schedules;
   a dispenser configured to dispense water to a user; and
   a tangible, non-transitory memory configured to communicate with the processor, the tangible, non-transitory memory having instructions stored thereon that, in response to execution by the processor, cause the processor to perform operations comprising:
   determining, via the processor, an amount of water received by the storage reservoir from the water production system;
   determining, via the processor an operational setpoint of the sanitation unit based, at least in part, on the amount of water received by the storage reservoir from the water production system;
   receiving, via the processor and through the user water management system a first input from a user indicating a request for water having a first water profile;
   determining, via the processor, an operational setpoint of the water customization unit based, at least in part, on the first input;
   setting, via the processor, the operational setpoint;
   in response to the operational setpoint being set, generating water having the first water profile by the water customization unit for dispensing to the user via a dispenser; and
   communicating to the user, via the processor and through the user water management system, at least one of: an amount of water produced by the water production system, an amount of water present in the storage reservoir, an amount of water dispensed to the user, and information relating to one or more water profiles including the first water profile,
   wherein the processor is configured to operate the system to dispense sanitized water having a custom water profile to the user in response, at least in part, to the first input by the user and an amount of water produced by the water production system and received by the storage reservoir.

2. The system of claim 1, wherein the water customization unit comprises:
   one or more additive cartridges, each additive cartridge comprising at least one of the additives configured to dissolve into water upon flowing therethrough;
   at least one pump configured to flow water through the one or more additive cartridges;

a water customization unit comprising:
  a mixing unit configured to mix water received from the one or more additive cartridges and/or from a bypass line; and
  a bypass line configured to allow at least a portion of water to bypass the one or more additive cartridges; and
  one or more proportional valves, each proportional valve configured to proportion water flow through the one or more additive cartridges in advance of dispensing to the user,
  wherein determining the operational setpoint of the water customization unit comprises determining a proportioning setpoint of the one or more proportional valves based, at least in part, on the first input, and
  wherein generating water having the first water profile comprises activating at least one pump to flow water through the one or more additive cartridges in a proportion based on the proportioning setpoint of the one or more proportional valves.

3. The system of claim 2, wherein generating water having the first water profile comprises:
  receiving the first input from the user comprising a water profile associated with a ratio of characteristics including: a water pH, a water mineral content, or a combination thereof;
  mixing, by the mixing unit of the water customization unit, the water output from the one or more additive cartridges to form water having a first water profile;
  bypassing at least a portion of water around the one or more additive cartridges via the bypass line;
  mixing, by the mixing unit, water output from the one or more additive cartridges and water from the bypass line to form water having the first water profile;
  forming a baseline water profile by bypassing the one or more additive cartridges via the bypass line;
  forming a fully adjusted water profile by flowing water through the one or more additive cartridges without water flow through the bypass line; or
  a combination thereof.

4. The system of claim 1, wherein the user water management system is further configured to:
  present, through the user interface of the user water management system, an option to select between two or more water profiles including the first water profile and a second water profile different from the first water profile;
  transmit, to the processor, a second input from the user indicating a request for water having the second water profile;
  wherein the operations further comprise:
  receiving, via the processor, the second user input indicating a request for the second water profile;
  adjusting, via the processor, the operational setpoint of the water customization unit based, at least in part, on the second input; and
  in response to the operational setpoint being adjusted, generating water having the second water profile for dispensing to the user via the dispenser.

5. The system of claim 1, wherein information relating to the one or more water profiles comprises: information relating to water temperature, mineral content, pH, total hardness, conductivity, calcium concentration, magnesium concentration, $CO_2$ concentration, microbe concentration or presence, oxidizing agent concentration or presence, total dissolved solids (TDS), turbidity, or a combination thereof.

6. The system of claim 1, wherein the one or more additives comprise: minerals, salts, potassium salts, magnesium salts, calcium salts, fluoride salts, carbonate salts, iron salts, chloride salts, silica, limestone, dolomite, their derivatives or combinations thereof.

7. The system of claim 1, wherein the system further comprises one or more sensors positioned at one or more locations within the system and configured to detect one or more water conditions comprising a water quality parameter, a water flow rate, a water production rate, a water level, or a combination thereof, and wherein the operations further comprise:
  receiving, via the processor, information from the one or more sensors relating to one or more water conditions comprising: a water quality parameter, a water flow rate, a water production rate, a water level, or a combination thereof;
  monitoring, via the processor, the received information relating to the one or more water conditions; and
  determining, via the processor, an operational setpoint of the water customization unit and an operational setpoint of the water sanitation unit based, at least in part, on the first input and the received information relating to the one or more water conditions.

8. The system of claim 1, wherein the processor is in communication with one or more sensors positioned to sense one or more conditions of water located within the storage reservoir; wherein the operations further comprise:
  receiving, via the processor, one or more signals indicative of the one or more water conditions sensed by the one or more sensors;
  adjusting, via the processor, an operational setpoint of the water customization unit, the sanitation unit, or both, in response to the one or more sensed water conditions;
  determining, via the processor and based on the one or more signals received by the one or more sensors, a concentration or presence of an oxidizing compound in the water within the storage reservoir; and
  adjusting, via the processor and through the sanitation unit, a quantity of the oxidizing compound generated based on the determined concentration or presence of the oxidizing compound in the water within the storage reservoir or a combination thereof.

9. The system of claim 1, further comprising a solar power supply configured to provide power to the water production system, and a grid power supply configured to provide power to the sanitation unit and the water customization unit.

10. The system of claim 1, wherein the sanitation unit and the water customization unit are configured to be powered by the water production system, and wherein the processor is in communication with the water production system to receive a water production system power state.

11. The system of claim 10, further comprising a battery configured to power the sanitation unit or the water customization unit, wherein the operations further comprise:
  determining, via the processor, the operational setpoint of the sanitation unit based, at least in part, on a power state of the water production system; and
  determining, via the processor, a charge rate and a discharge rate, or a combined charge and discharge rate of the battery based, at least in part, on the power state of the water production system.

12. The system of claim 1, wherein the water production system comprises:
  an array of water generation units, each water generation unit configured to generate water; and
  one or more liquid water conduits fluidly connecting each water generation unit to the storage reservoir, the one or more liquid water conduits configured to direct water generated by the water generation units to the storage reservoir.

13. The system of claim 1, wherein the operations further comprise:
determining, via the processor, an operational setpoint of the sanitation unit by determining an ozone generation schedule based on at least one of diurnal temperature variation, diurnal relative humidity variation, diurnal solar insolation variation, a weather forecast, or a water production rate of the water production system;
setting, via the processor, the operational setpoint based on the determined ozone generation schedule;
in response to setting the operational setpoint, generating ozone, via an ozone generator of the sanitation unit, according to the determined ozone generation schedule; and
in response to generating ozone, applying the generated ozone to water contained within the water storage reservoir according to the ozone generation schedule.

14. The system of claim 1, further comprising one or more sensors positioned to detect water conditions within the storage reservoir, the one or more sensors configured to sense a sanitation parameter comprising an ozone concentration, a presence of ozone, a microbe concentration, a presence of microbes, or a combination thereof, wherein the processor is configured to determine the operational setpoint of the sanitation unit by performing operations comprising:
receiving, via the processor and from the one or more sensors the sanitation parameter;
determining, via the processor, an ozone generation schedule based on the sanitation parameter;
determining, via the processor, whether a flow rate of water input from the water production system to the storage reservoir is above a predetermined threshold; and
activating, via the processor, the sanitation unit if the flow rate is above a predetermined threshold.

15. The system of claim 1, further comprising a recirculation flow path fluidly coupled to the storage reservoir, the recirculating flow path configured to direct water from the storage reservoir through the sanitation unit, and back to the storage reservoir,
wherein the sanitation unit comprises an oxidizing compound generator configured to generate an oxidizing compound, and
wherein the operations further comprise:
commanding, via the processor, recirculation of water from the storage reservoir, through the recirculation flow path;
in response to the recirculation command, generating, by the oxidizing compound generator of the sanitation unit, the oxidizing compound;
in response to the recirculating command, generating by the oxidizing compound generator of the sanitation unit, the oxidizing compound; and
applying the oxidizing compound to the water within the recirculation flow path.

16. The system of claim 1, further comprising:
an inbound flow path configured to direct water to the storage reservoir;
a recirculation flow path configured to direct water from the storage reservoir, through the sanitation unit, and back to the storage reservoir;
one or more flow control components configured to control water flow through the inbound and recirculation flow paths;
a processor in communication with the water production system, the sanitation unit, and the one or more flow control components;
wherein the processor is configured to operate the system in a plurality of modes including at least two of:
a quiet mode, wherein the processor receives, via the user interface, an input indicating a request for a quiet time period, and determines a quiet schedule to operate the sanitation unit and the water production system accordingly;
a hibernation mode, wherein the processor reduces operation of the water production system to avoid damage due to extreme environmental conditions;
a power save mode, wherein electrical power is not supplied to the sanitation unit;
an inbound water mode, wherein the processor controls the one or more flow control components to direct water through the inbound flow path and through at least a portion of the recirculation flow path prior to entry into the storage reservoir; and
a recirculation maintenance mode, wherein the processor controls the one or more flow control components to direct water from the storage reservoir through the recirculation flow path and back to the storage reservoir.

17. The system of claim 1, further comprising:
one or more sensors positioned to detect a conductivity level and a pH value of the water in the storage reservoir;
a water customization unit comprising:
a mineral addition subsystem configured to add one or more minerals into the water; and
a pH adjustment subsystem configured to add one or more pH-adjusting compounds into the water,
wherein the operations further comprise:
determining, via the processor and based on data from the one or more sensors, whether the conductivity of the water in the storage reservoir is below a predetermined threshold;
activating, via the processor, the mineral addition subsystem of the water customization in response to determining that the conductivity of the water is below a predetermined threshold;
determining, via the processor and based on data from the one or more sensors, whether the pH value of the water in the storage reservoir is below a predetermined threshold; and
activating, via the processor, the pH adjustment subsystem of the water customization unit in response to determining that the pH value of the water in the storage reservoir is below the predetermined threshold.

18. The system of claim 1, further comprising one or more water level sensors positioned to detect a water level within the storage reservoir, wherein the operations further comprise:
determining, via the processor and based on data from the one or more level sensors, a water level in the storage reservoir;
determining, via the processor, whether a predetermined time period has elapsed; and
activating, via the processor, the sanitation unit based on the water level in the storage reservoir, if the predetermined time period has elapsed.

19. The system of claim 1, further comprising a remote server in communication with the processor wherein the processor is a local processor, and the user interface, wherein the remote server comprises:

a second memory; and a second processor, wherein the second processor is a remote processor comprising at least:

an administration function, wherein the administration function retrieves information from the local processor relating to characteristics of water production and water usage by the user;

a water profile suggestion function, wherein the water profile suggestion function causes the local processor to compare previously stored data indicative of a water profile setpoint history to at least one previously stored suggested water profile in the remote server; and a display function that causes the user interface to present the at least one previously stored suggested water profile to the user.

20. The system of claim 1, further comprising:

a water management system comprising the storage reservoir, the sanitation unit, the water customization unit, and the processor collectively housed in a housing assembly physically housing the components of the water management system, wherein the housing assembly is physically separate from the water production system; and a water conduit physically coupling the water production system to the water management system, the water conduit configured to direct produced water from the water production system to the water management system.

* * * * *